(12) United States Patent
Feldmann et al.

(10) Patent No.: US 11,799,745 B2
(45) Date of Patent: Oct. 24, 2023

(54) DISTRIBUTED AND TIMELY NETWORK FLOW SUMMARIZATION AT SCALE

(71) Applicant: MAX-PLANCK-GESELLSCHAFT ZUR FÖRDERUNG D. WISSENSCHAFTEN E.V., Munich (DE)

(72) Inventors: Anja Feldmann, Berlin (DE); Said Jawad Saidi, Saarbrücken (DE); Georgios Smaragdakis, Berlin (DE); Damien Foucard, Berlin (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 17/059,434

(22) PCT Filed: Jun. 5, 2018

(86) PCT No.: PCT/EP2018/064779
§ 371 (c)(1),
(2) Date: Nov. 28, 2020

(87) PCT Pub. No.: WO2019/233567
PCT Pub. Date: Dec. 12, 2019

(65) Prior Publication Data
US 2021/0211364 A1 Jul. 8, 2021

(51) Int. Cl.
*H04L 43/026* (2022.01)
*H04L 43/045* (2022.01)
*H04L 43/062* (2022.01)

(52) U.S. Cl.
CPC .......... *H04L 43/026* (2013.01); *H04L 43/045* (2013.01); *H04L 43/062* (2013.01)

(58) Field of Classification Search
CPC .... H04L 43/026; H04L 43/045; H04L 43/062
See application file for complete search history.

(56) References Cited

U.S. PATENT DOCUMENTS

| | | | |
|---|---|---|---|
| 2003/0088529 A1* | 5/2003 | Klinker | ................ H04L 43/00 706/3 |
| 2005/0131946 A1 | 6/2005 | Korn et al. | |

(Continued)

FOREIGN PATENT DOCUMENTS

WO 2016196683 A1 12/2016

OTHER PUBLICATIONS

WIPO, International Search Report dated Jan. 2, 2019 in International Appln. No. PCT/EP2018/064779, (7 p.).

(Continued)

*Primary Examiner* — Anh Nguyen
(74) *Attorney, Agent, or Firm* — Siritzky Law, PLLC

(57) ABSTRACT

Method and system for capturing summaries of data flows in an electronic, packet-switched communication network, the method comprising: receiving, from a node of the communication network, packet flow data; obtaining a subset of the packet flow parameters (IP src, IP dst, port src, port dst, protocol), based on the packet flow data; obtaining a packet flow statistic, based on the packet flow data; updating a collection of stored packet flow summaries, based on a subset of the packet flow parameters and the packet flow statistic. The stored packet flow summaries are arranged as nodes in a tree data structure.

17 Claims, 20 Drawing Sheets

(56) References Cited

U.S. PATENT DOCUMENTS

| | | | |
|---|---|---|---|
| 2006/0072582 A1 | 4/2006 | Bronninmann et al. | |
| 2006/0229931 A1* | 10/2006 | Fligler | G06Q 30/02 |
| | | | 705/7.38 |
| 2007/0180321 A1* | 8/2007 | Connally | G06F 11/3672 |
| | | | 714/33 |
| 2008/0256549 A1* | 10/2008 | Liu | G06Q 10/06 |
| | | | 718/106 |
| 2009/0012746 A1* | 1/2009 | Kairo | G01V 99/00 |
| | | | 702/181 |
| 2009/0016234 A1* | 1/2009 | Duffield | H04L 63/1425 |
| | | | 370/252 |
| 2017/0250953 A1* | 8/2017 | Jain | H04L 63/0218 |
| 2017/0279837 A1 | 9/2017 | Dasgupta et al. | |
| 2019/0272333 A1* | 9/2019 | Siddiqi | G06F 16/287 |

OTHER PUBLICATIONS

WIPO, Written Opinion dated Jan. 2, 2019 in International Appln. No. PCT/EP2018/064779, (14 p.).

WIPO, International Preliminary Report dated Dec. 8, 2020 in International Appln. No. PCT/EP2018/064779, (15 p.).

* cited by examiner

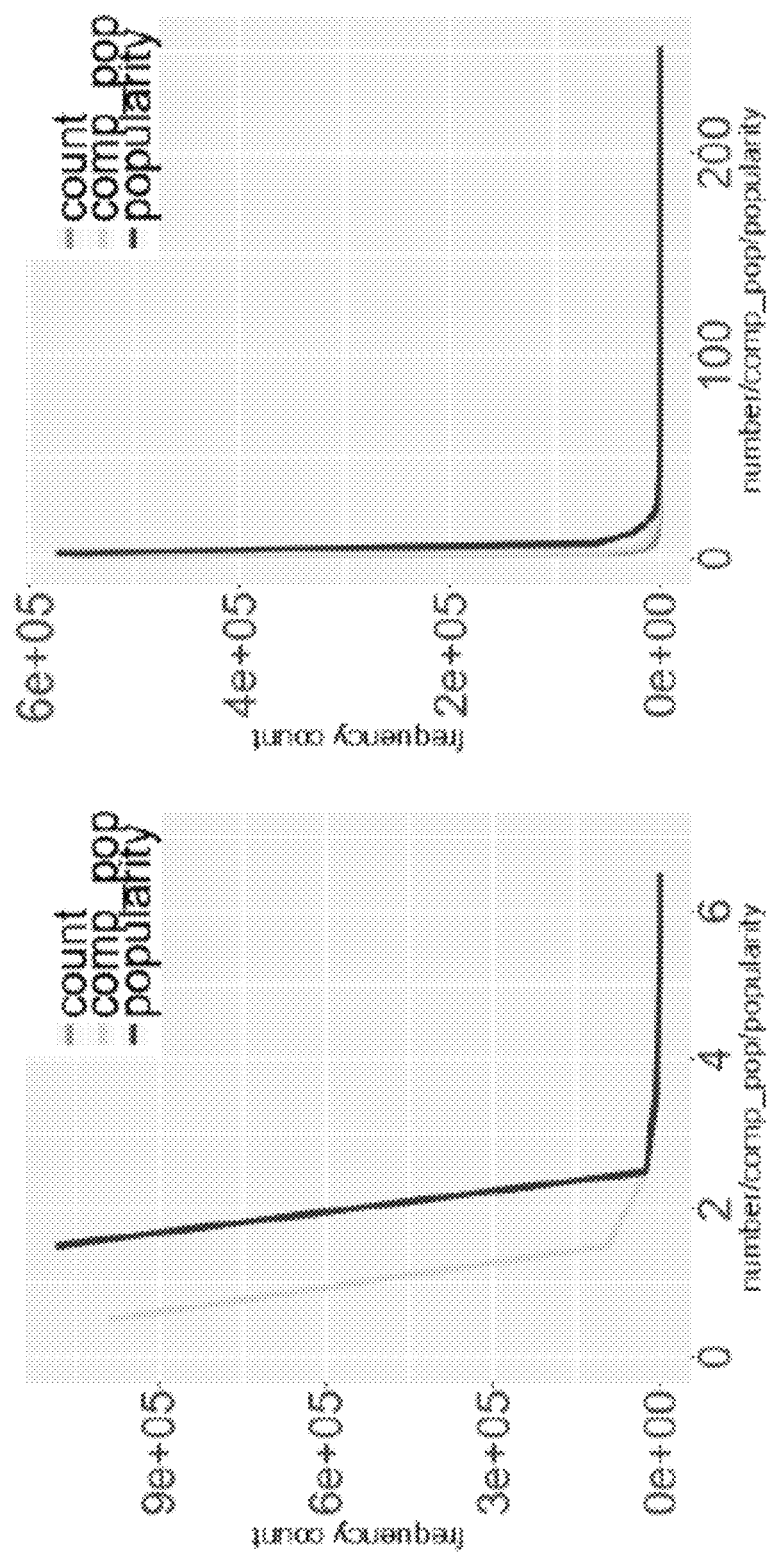

(c) MAWI: 4-f, 40K (d) Equinix-Chicago: 1-f, 10K

DISTRIBUTED AND TIMELY NETWORK FLOW SUMMARIZATION AT SCALE

RELATED APPLICATIONS

This application is a 371 of International application PCT/EP2018/064779, filed Jun. 5, 2018, the entire contents of which are hereby fully incorporated herein by reference for all purposes.

The present invention relates to methods and systems for distributed and timely network flow summarization at scale.

TECHNICAL BACKGROUND

Network operators have to continuously keep track of the activity in their network to identify a wide range of unusual events, e.g., attacks or disruptions, as well as to derive statistics over long time windows to provision their network or make informed peering decisions. Typically, they rely on flow-level or packet-level data captured at different routers in their network. In the last years, all major router vendors have made flow and packet capture utilities available in their products. A flow capture maintains information about the 5-tuple (protocol, source IP, destination IP, source port, destination port, traffic exchanged) while a packet capture stores the header of, typically, sampled packets that traverse a router. Among the most popular flow captures are Netflow and IPFIX while the libcap library is the most common packet-level capture utility.

The increasing availability of large-scale flow and packet captures make it possible for the operators to get insights about the state and the health of their network. However, this comes at certain costs. The massive amount of data is increasingly difficult to store, transfer, or analyze promptly, as line speeds and the number of online users and applications steadily increase. Moreover, stored flow or packet captures do not provide an obvious way to answer typical operator questions, e.g., to find the start or end of an attack event. Indeed, most queries require scanning multiple captures—an inefficient, often manual, and slow process which restricts ad-hoc queries. This underlines the need for online indexing of flows on top of existing captures.

Indeed, for most network operators the storage of flow and packet captures is a pressing issue. Since it is prohibitively expensive to store all the captured data, they typically have to delete past captures, e.g., using expiration dates. This practice further limits the range of investigation.

The magnitude of the problem is further increased by the fact that flow captures are typically collected at multiple border and backbone routers in a network. Transferring the raw traces to a centralized processing location is (a) increasingly expensive due to the data volume or (b) may be forbidden due to regulatory restrictions or due to different jurisdictions.

A known approach to these problems is to capture (only) aggregate information, i.e. summaries of the actual network flows. However, the community has not agreed on any appropriate summary yet. Keeping summaries of only the most popular 5-tuple flows misses information on less popular ports, or less popular source and destination prefixes. Indeed, most queries are for aggregated information rather than full-fledged 5-tuples. For example a network operator that wants to optimize its routing might want to know what the most popular source-destination prefixes are. Network planners may want to know the most popular ports, source prefixes and destination prefixes and which are the trends in applications and services. An operator investigating a network failure may want to know what the biggest changes in its network traffic flow are. An operator studying the effect of an attack want to know which of its prefixes are under attack or which are the sources of the attack, respectively, as well as if the attack is distributed or localized. From the operational point of view, it is mission-critical to be able to shift large amounts of network traffic by utilizing the insights of flows, and, thus, promptly respond to failures, attacks, and misconfigurations. All the above questions can be answered from the raw data but only at the cost of maintaining a huge data warehouse as well as significant processing capabilities. To the best of the inventors' knowledge, a distributed flow processing system that can answer complex queries on-the-fly at scale is not available today. The problem of efficiently analyzing massive amounts of network traces is therefore a long standing one.

PRIOR ART

Approaches include developing efficient data structure, i.e., hierarchical heavy hitter, using advanced mathematical methods, e.g., principal component analysis, building massive data warehouses, and deploying adaptive network capture facilities.

The work by Mitzenmacher et al. (M. Mitzenmacher, T. Steinke, and J. Thaler. Hierarchical Heavy Hitters with the Space Saving Algorithm. In ALENEX, 2012.) introduced the problem of hierarchical heavy hitters (HHH). HHH extends the online frequent items inference problem (see e.g. G. Cormode and M. Hadjieleftheriou. Finding Frequent Items in Data Streams. In VLDB, 2008) and creates a hierarchical data structure where the most popular items, e.g., IP prefixes, are arranged in a hierarchy. They provide a construction algorithm of the data structure as well as worst-case and space bounds that outperforms those of earlier algorithms. Storing summaries in this way can be efficiently implemented in commodity router hardware and can keep the heavy hitters at each aggregation level. The work of Basat et al. (R. B. Basat, G. Einziger, R. Friedman, M. C. Luizelli and E. Waisbard. Constant Time Updates in Hierarchical Heavy Hitters. In ACM SIGCOMM, 2017) solves a probabilistic version of HHH problem that was introduced in Mitzenmacher et al. (ibid.). It is suitable to cope with modern line speeds and in Network Function Virtualization (NFV) environments. It guarantees constant time updates in hierarchical heavy hitters. All these works rely on packet-level captures and the focus in on efficient implementation on router hardware. Randomized approaches to improve the accuracy and maintenance of individual network flows using fast but limited router memory has been an active research area.

The above approaches focus on computing summaries at a single router. Next, examples are given of work on network wide analysis. Among of the most relevant one is the work by Lakhina et al. ( ). In the paper "Diagnosing Network-Wide Traffic Anomalies" (A. Lakhina, M. Crovella, and C. Diot. In ACM SIGCOMM, 2004), the authors collect Netflow data from different routers and propose a general method to diagnose anomalies, i.e., behavior that deviates from the normal operation. Their method uses the Principal Component Analysis (PCA) to efficiently separate the high-dimensional space occupied by a set of network traffic measurements into disjoint subspaces corresponding to normal and anomalous network conditions. PCA analysis on network flow data was also used in the paper "Structural Analysis of Network Traffic Flows" (A. Lakhina, K. Papagiannaki, M. Crovella, C. Diot, E. D. Kolaczyk, and N. Taft.

In ACM SIGMETRICS, 2005) to construct traffic matrices and categorize origin-destination flows in categories, such as flows with common periodic trends, short-lived bursts, and noise based on their structural characteristics. The distributions of packet features (IP addresses and ports) observed in flow captures was used in the paper "Mining Anomalies Using Traffic Feature Distributions" (A. Lakhina, M. Crovella, and C. Diot. In ACM SIGCOMM, 2005) to infer the existence and type of anomalies. These approaches are complementary to the invention as they focus on the structural characteristics of the flows to infer anomalies or which flows contribute more to the overall traffic than answering complex queries about the state of the network.

Recently, systems have been proposed which improve the efficiency of answering Structured Query Language (SQL) queries on massive network data captures. Datix (D. Sarlis, N. Papailiou, I. Konstantinou, G. Smaragdakis, and N. Koziris. Datix: A System for Scalable Network Analytics. ACM CCR, 45(5), 2015) relies on smart partitioning storage schemes to support fast join algorithms and efficient execution of filtering queries. Although the analysis can be parallelized using available map-reduce systems, it requires all the flow captures to be present at one location. Other systems deal with the collection and analysis of connection/server logs, e.g., Akamai has developed Query (J. Cohen, T. Repantis, J. McDermott, S. Smith, and J. Wein. Keeping Track of 70,000+ Servers: The Akamai Query System. In USENIX LISA, 2010), that collects data at its hundreds of thousands edge servers and aggregates it to several hundred places to be used to answer SQL queries. Network operators also have designed and operated warehouses for the collection of network measurements, storage and correlation of network data of different types. Indeed, with Gigascope (C. Cranor, T. Johnson, O. Spataschek, and V. Shkapenyuk. Gigascope: A Stream Database for Network Applications. In ACM SIGMOD, 2003) it is possible to install rules in every system to answer queries. However, this is limited in terms of the number of parallel queries as well as its restriction to future data.

Wide-area analytics have also been proposed to push computation at the edge data centers and efficiently exchange information between data centers.

In conclusion, even though the ability to collect flow captures is a commodity in modern routers, the challenges of efficiently analyzing massive flow captures from a large network that spans multiple time periods are yet unmet.

It is therefore an object of the present invention to provide data structures, methods and systems for distributed and timely network flow summarization at scale

SUMMARY OF THE INVENTION

This object is achieved by the methods and systems of the independent claims. Advantageous embodiments are defined in the dependent claims.

The succinct summaries enabled by the invention reduce the requirements for local storage significantly. Thus, even if the raw flow captures are deleted these summaries can provide accurate answers even at different time granularities. In addition, the inventive system can periodically or per-request send these summaries to a centralized processing unit as the volume of these summaries are small compared to the raw flow captures. It is also possible to further reduce the transfer volume of the summaries by sending only the difference of consecutive summaries, or by compressing the tree before transferring. Moreover, the structure of the summary allows to merge summaries or find difference between summaries. Thus, it is easy to answer queries quickly from summaries that originate from different collection points or that are collected across time. The answers that the invention can offer are estimations as they are based on summaries. Nevertheless, it is the first system that enables interactive rather than batch-style interface for real-time and historical network analysis. Moreover, answers by the inventive systems and methods can guide the operators on when and how to further analyze the original data in the traditional script based style.

BRIEF DESCRIPTION OF THE FIGURES

These and other aspects and advantages of the invention are explained more thoroughly in the following detailed description of various embodiments of the invention, in connection with the drawing, in which.

DETAILED DESCRIPTION

Figure 1:
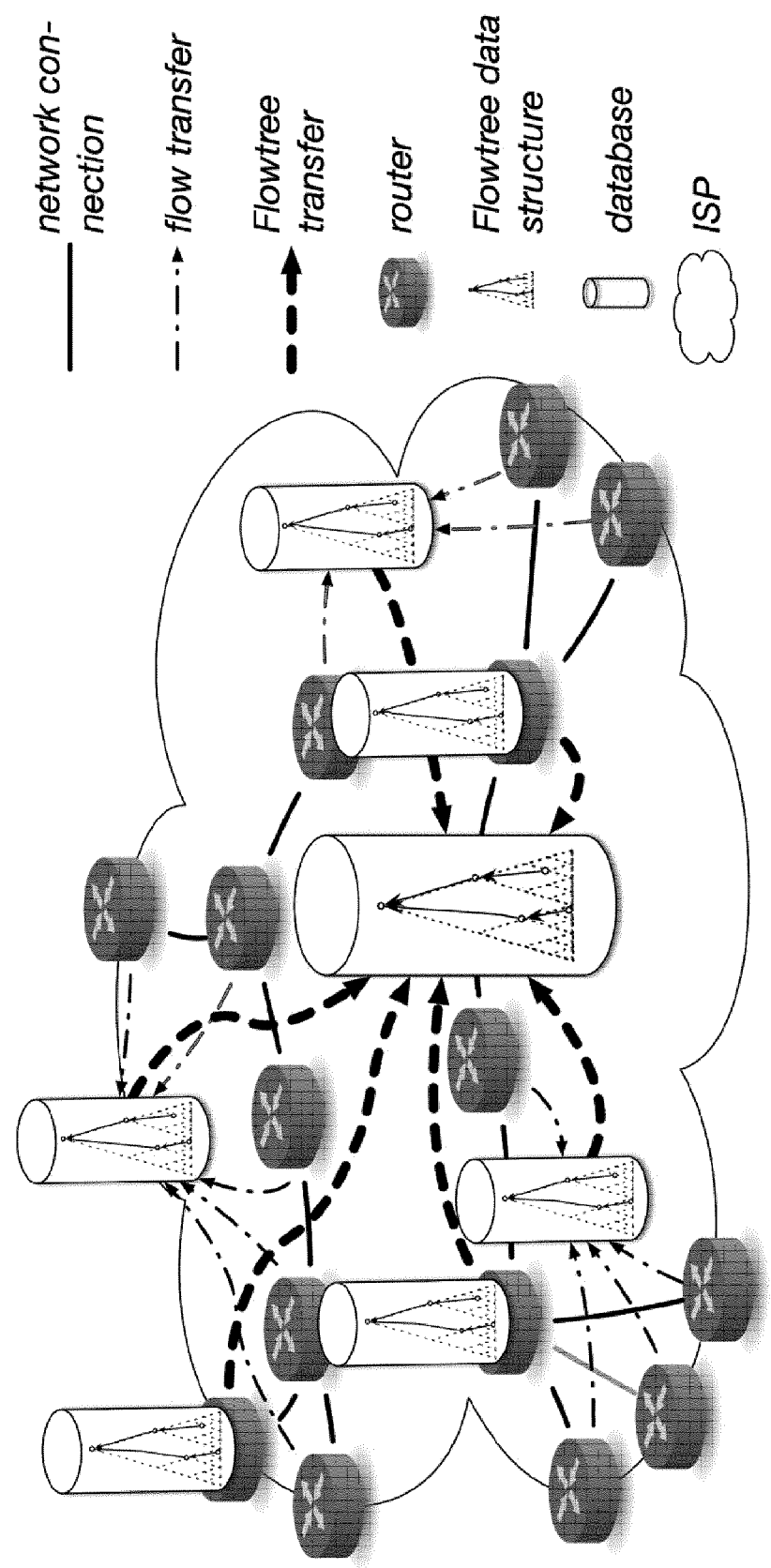
FIG. 1 shows an overview of a Flowstream system according to an embodiment of the invention.

FIG. 1 shows a distributed system for processing network packet or flow captures, e.g., netflow or IPFIX data, and for efficiently maintaining flow summaries according to a first embodiment of the invention, called a Flowstream system.

The Flowstream system (i) operates on top of existing flow capture utilities, (ii) guarantees prompt and accurate execution of queries for popular generalized flows, and (iii) does so across sites and/or across time.

The Flowstream system continuously constructs and maintains a summary of the active flows using a novel self-adjusting data structure. The data structure maintains a hierarchical tree and keeps an accurate replica for the most popular generalized flows (the leaves of the tree) and aggregated statistics for less popular flows (interior nodes of the tree-upwards in the flow hierarchy). This data structure enables accurate and timely answer for queries across multiple dimensions. In effect, the data structure creates an index of and sorts the active generalized flows based on their popularity. Thus, it is also easy to identify not only flows that are popular but also those that are not.

The invention envisions that each router exports its data to a close-by daemon using an existing API of e.g., Netflow or IPFIX. It continuously constructs and maintains a summary of the active flows using a novel self-adjusting data structure, described later. The data structure maintains a hierarchical tree and keeps an accurate replica for the most popular generalized flows (the leaves of the tree) and aggregated statistics for less popular flows (interior nodes of the tree-upwards in the flow hierarchy). This data structure enables accurate and timely answer for queries across multiple dimensions. In effect, the data structure creates an index of and sorts the active generalized flows based on their popularity. Thus, it is also easy to identify not only flows that are popular but also those that are not.

Data is gathered at N different location of the network, with local storage and some computational capabilities. Most of queries are for feature hierarchies H 1 to H h at various time granularities ranging from minutes to days.

Then with Flowtrees it is possible to compute flow summaries at each locations for all these hierarchies, H 1 to H h, at one-minute time intervals. These can then be aggregated across time at each location and for each hierarchy, separately, using the merge operator. Afterwards applying the compress operator reduces the memory footprint, if needed, to the same order of magnitude as the two individual trees.

Then the central data management can ask each location to upload the Flowtrees for each hierarchy at, e.g., an hour time granularity. These can then be merged, compressed, and stored at the central data management unit. This enables the central data management to answer all queries at 1-hour granularity. If a user requires a more fine-grained answer along the time axis the query can be sent to the distributed locations and answered jointly. If a user wants to investigate a specific incident the diff and Top-K operators allows them to quickly identify how/where to refine the query: in time, location, or both.

Figure 2:
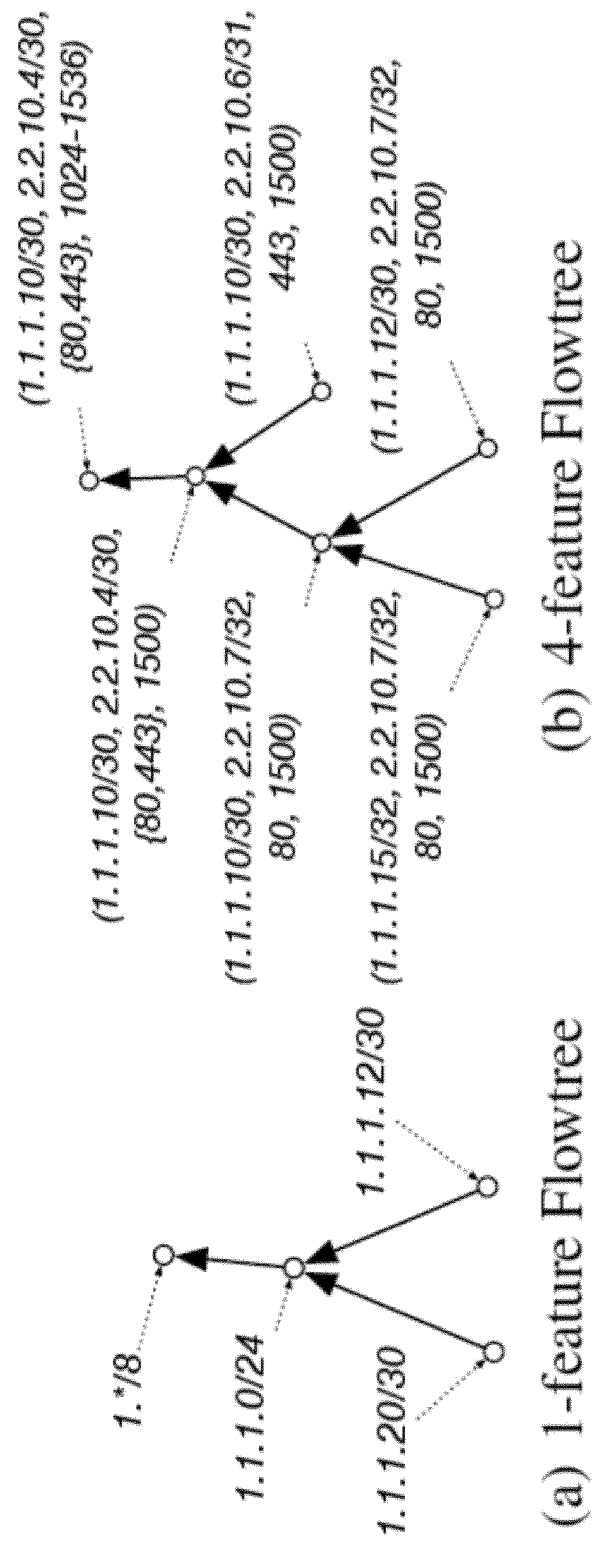
FIG. 2 shows examples of Flowtree data structures according to an embodiment of the invention.

FIG. 2 shows examples of Flowtree data structures according to an embodiment of the invention.

The goal of the Flowtree data structure is to dynamically and in a self-adjusting manner track the essential features of the input stream. It does so by taking advantage of the concept of generalized flows: Flows summarize related packets over time at a specific aggregation level. Possible flow types include "5-feature" flows, i.e., protocol, src, dst IP, src, dst port number. Other flow types are "2-feature" flows, i.e., (src and dst prefixes) or dst prefix and dst port.

Figure 3:
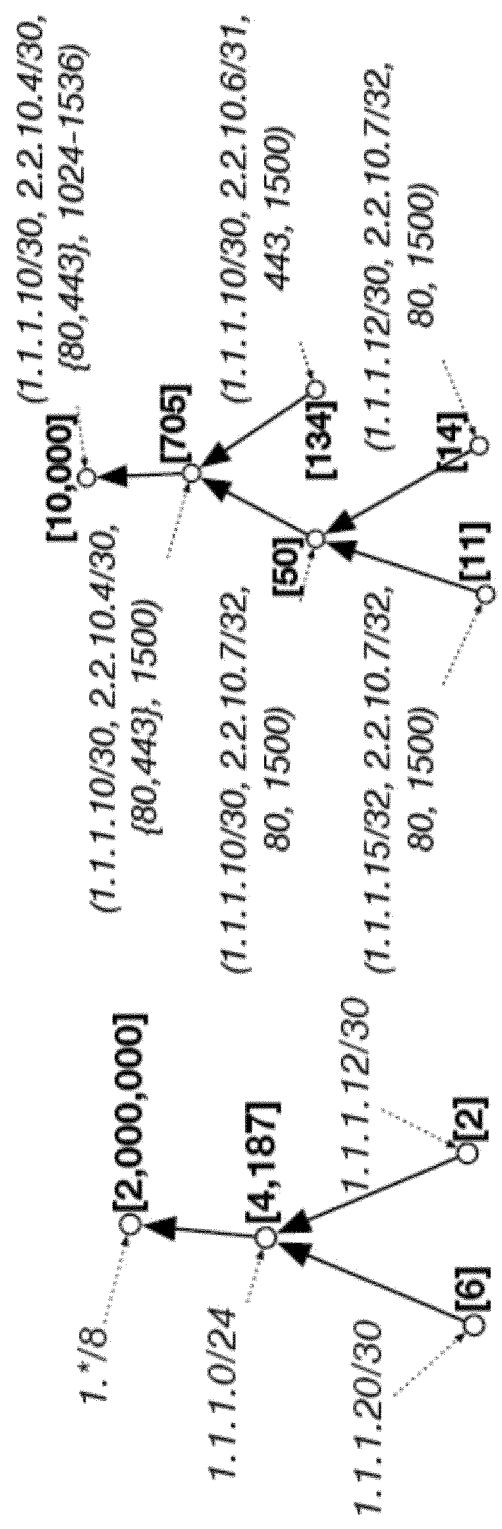
FIG. 3 shows examples of Flowtree data structures with popularities according to an embodiment of the invention.

Each flow type has a natural hierarchy which can be reflected in a directed graph. A node corresponds to a flow and an edge exists between any two nodes a, b if a is a subnode of b in the hierarchy, i.e., if $a \subset b$, see FIG. 2. If the graph is a tree, a strict hierarchy exists among the corresponding flows. In networking hierarchies are often expressed via network prefixes for IP addresses or port ranges for ports. These as well as other hierarchies are expressible using wildcards. One can map any trace of packets or flows to a corresponding flow graph by annotating each node with its popularity. Popularity can be measured in terms of packet count, flow count, byte count, or any combinations thereof. If the graph is a full tree, then the popularity of a node is the sum of the popularities of the children. If it is not a full tree the popularity of the node is the sum of its own popularity plus the sum of the popularities of its children, see FIG. 3.

Such a graph can, in principle, be used to answer most summary queries about the traces it was built from. Its only limitation is that it is a summary which does not allow zooming in with regard to time. Among the most common questions are summaries such as what are the most popular destinations, most popular ports, most popular source destination pairs, most popular destination prefixes per destination ports. Other queries may ask if there is any particular source IP address or destination address that was unusually active. Was a specific address range active or not active in a given time frame (affected or not affected by a downtime or an attack). All of these questions can be answered using flow summaries at various granularities. Indeed, most of these granularities can be used to build fixed hierarchies such that the corresponding flow graph is a tree. Possible hierarchies include one feature trees, i.e., src prefix, dst prefix, src port, or dst port. Two feature trees include, src and dst prefix, or src and dst port, or src prefix and src port, or dst prefix and dst port. Four feature trees may include src, dst prefix together with src, dst port. To give an example of a 1-feature tree consider an IP under attack 31.21.221.111/32. The parent of this node may be 31.21.221.110/30, using an increment of two on the prefix length. The parent of that node is 31.21.221.106/28, etc. up to 0.0.0.0/0 which is the root of the tree. For ports similar hierarchies can be defined using port ranges. For example 0/16 refers to port 0 only, 0/14 to the ports from 0 to 4, 0/10 to o to 64, and 0/0 to the full port range. Other ways of summarizing ports are feasible, e.g., grouping ports such as all web related ports into one subgroup.

The Flowtree algorithm is dynamically creating and maintaining a Flowtree data structure. However, since such trees can have many nodes one cannot afford to keep all nodes, as evidenced by the following table 1.

| Features | Maximum number of entries |
| --- | --- |
| IP src | $2 \times 2^{32} = 2^{33} \approx 8.6 \times 10^9$ |
| IP dst | $2^{33} \approx 8.6 \times 10^9$ |
| port src | $2^{17} \approx 1.3 \times 10^6$ |
| port dst | $2^{17} \approx 1.3 \times 10^6$ |
| IP src, IP dst | $(2^{33})^2 \approx 7.4 \times 10^{19}$ |
| port src, port dst | $(2^{17})^2 \approx 1.7 \times 10^{10}$ |
| IP src, port src | $2^{33} \times 2^{17} \approx 1.12 \times 10^{15}$ |
| IP dst, port dst | $2^{33} \times 2^{17} \approx 1.12 \times 10^{15}$ |
| IP src, IP dst, port src, port dst | $(2^{33})^2 \times (2^{17})^2 \approx 1.3 \times 10^{30}$ |
| IP src, IP dst, port src, port dst, protocol | $(2^{33})^2 \times (2^{17})^2 \times 2^9 \approx 6.5 \times 10^{32}$ |

Rather, the invention extends Flowtrees towards a self-adjusting data structure that maintains the essential nodes so that all queries can be answered promptly with an acceptable accuracy while minimizing memory usage and computation. Here, the core insight is that the algorithm will keep the "popular" nodes and summarize the "unpopular" ones. Thus, the inventive Flowtree algorithm borrows from the hierarchical heavy hitter (hierarchical heavy hitters) algorithms, as well as the algorithm for maintaining efficient statistics from tree-search methods. The main difference between the two and Flowtree is that the hierarchical heavy hitters algorithms maintains a heavy hitter data structure for each level of the hierarchy, while the algorithm in maintains a cut through the tree and, then, either pushes the cut nodes down or up in the tree to dynamically adjust the data structure to the input. Note that the Flowtree algorithm maintains the tree explicitly. Moreover, it only keeps "complementary popularities. This allows Flowtree to eliminate interior as well as leaf nodes of the tree whose popularity is not significant.

Flowtrees can be efficiently constructed and offer five basic operators: merge, compress, diff, top-K, and query. In effect, Flowtree is an alternative data structure for solving the one-dimensional hierarchical heavy hitter (HHH) problem with amortized O(1) update time. Thus, it offers an interface for on-the-fly queries, preconfigured queries, as well as queries on stored Flowtrees. Preconfigured queries are supported by using sticky nodes. These are added when the Flowtree is initialized and never removed.

The storage requirement of Flowtrees are rather reasonable. Most of the experiments carried out by the inventors, have used 10 k-50 k nodes which yields significant compression ratios: 100:1 or even 1028:1. The compression ratios are expected to be even higher for IPv6 given the larger address space and the frequent reassignment of addresses to the same host according to the protocol specifications and common practices [27]. Despite the high compression, popular entries are represented by a single node in the tree, and can, thus, be reported with a high accuracy, while their less popular counterparts are aggregated so that their joined popularity is captured by nodes higher in the feature hierarchy.

Figure 4:
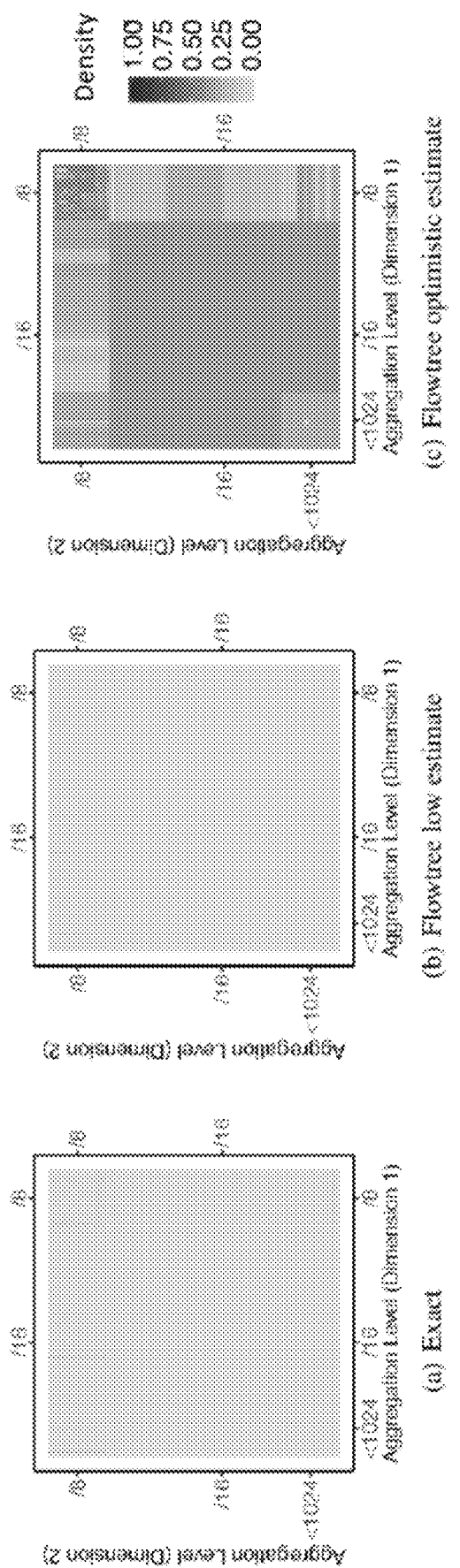
FIG. 4 shows a heatmaps of src and dst port range activities (granularity /16 for lower left and /8s for upper right part).

FIG. 4 shows the popularity of source and destination ports of a 600K trace. Each heatmap has four parts. The lower-left shows the popularity for each port combination for ports less than 1024. Thus, the first entry corresponds to src and dst port 0. The upper-right shows the popularities aggregated to the /8 /8 level. The lower-right and upper-left show the corresponding popularities at the /16 /8 and /8 /16 level. The left plot shows the exact popularities. The middle one shows a lower bound estimate while the right one shows an optimistic estimate from the Flowtree. Note the similarities as well as differences: All matrix elements with significant popularity are also present in the Flowtree. But the Flowtree is also able to highlight areas with significant popularity where no single entry is popular with only 20K entries.

Flowtree Construction

In a Flowtree each node represents a flow according to a specific feature hierarchy (which is predefined) and has a certain popularity. Hence, it is possible to determine the direct parent and the direct children of each node from the features of the node. However, to keep the Flowtree sparse not all nodes are present. Rather, they are only added if the corresponding flow has some popularity.

The Flowtree algorithm builds the Flowtree data structure as it processes its input, either flows, e.g., from features from the input and use them to build a corresponding node:

---
Algorithm 1 Flowtree: Build
---

Input: pkts or flows
Output: Flowtree
1:    Initialize Flowtree
2:    for all pkts/flows do
3:        Extract features from pkt or flow.
4:        Construct node from features.
5:        Add (Flowtree, node, pkt/flow), (see Alg 2).

Then, this node is updated within the Flowtree or added to the tree:

---
Algorithm 2 Add
---

Input: Flowtree, node, pkt/flow
1:    Add_node(Flowtree, node, pkt/flow), see Alg. 3
2:    next = next_parent(node)
3:    while next != parent(node) do
4:        Add_node(Flowtree, next, NULL) with probability p
5:        = next_parent(next)

To add a node to a Flowtree, it is first checked if the node already exists in the tree:

---
Algorithm 3 Add_node
---

Input: Flowtree, node, pkt/flow
1:    if node exists then
2:        Comp_pop[node] += flow/pkt stats
3:    else
4:        Insert node with comp_pop[node] = flow/pkt stats
5:        parent(node) = find_parent(Flowtree, node)
6:        for child in children(parent(node)) do
7:            if child subset node then
8:                parent(child) = node If it does one can simply update the information maintained at the node according to the contribution of the flow/packet. If the node does not exist, its "longest matching" parent is found in the tree. There are many different ways in which this problem can be tackled as it corresponds to the packet classification problem. Most advantageously, each node knows its direct parent. This means that if all nodes of the Flowtree are added to a hash table, hashing can be used to check if the direct node parent is in the tree. If so, the algorithm is done; otherwise it recurses. To ensure termination the root is always kept in the Flowtree. Hence, if the leaf node is in the tree, the cost of processing a pkt/flow is constant.

Figure 5:
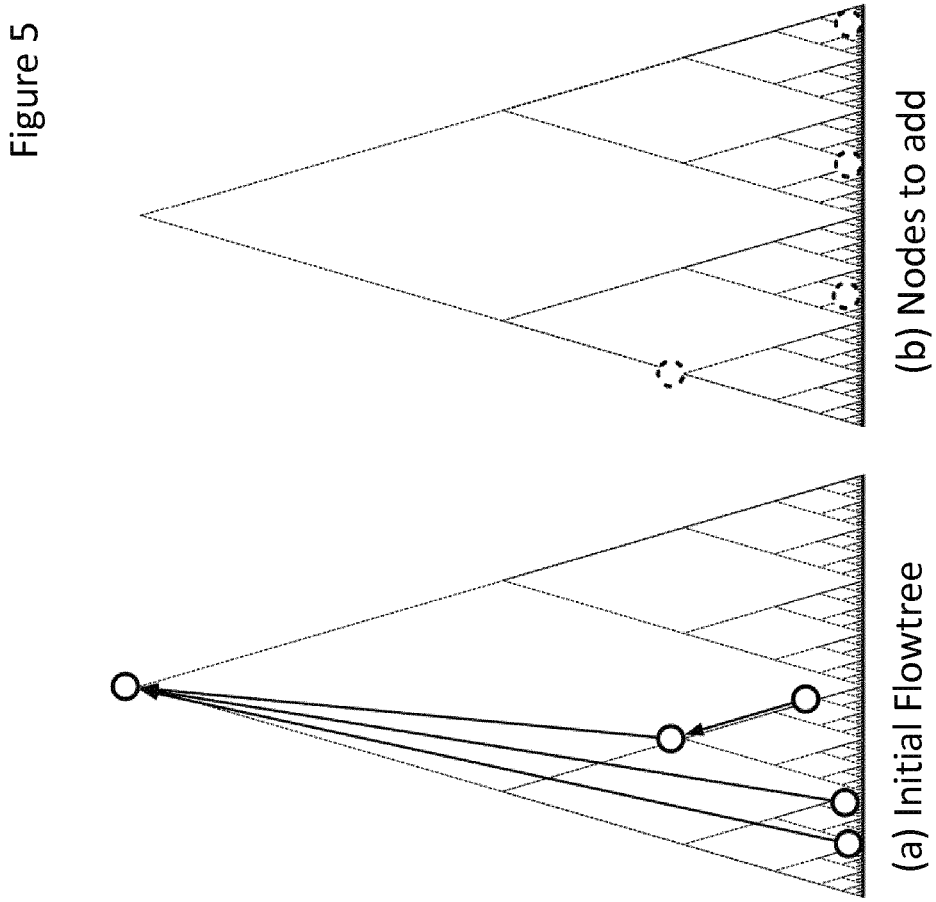
FIG. 5 illustrates an addition of nodes to a Flowtree data structure according to an embodiment of the invention (added parents in gray).

If the leaf node is not in the tree, the cost is limited by the depth of the hierarchy. To reduce this cost interior nodes are needed. While there are many possible strategies, the invention proposes the following: Either add all missing nodes on the path from the leaf node to its current parent or add each of these nodes with a certain probability p, see Alg. 2. For example p=0.1 may be used. The first approach saves lookup time while the second reduces memory usage. For a schematic visualization of the operation see FIG. 5. This way of adding a leaf ensures that the tree is expanding towards areas of high popularity. This is the expand part of the self-adjusting data structure.

Flowtree Statistics

When adding a node to Flowtree, see Alg. 2, the statistics of the first leaf node are updated. This is contrary to the 1D-HHH approaches. Mitzenmacher et al. [25] updates the statistics of all intermediate nodes. Basat et al. [4] updates the statistics of a random node and, then, relies on the heavy hitter paradigm to update the statistics of all nodes over time. The insight of the invention is that one does not maintain accurate popularities of each flow with the stats. Rather, each node maintains the complementary popularity (comp pop), namely, its popularity (pop) that is not covered by any of the children.

Figure 6:
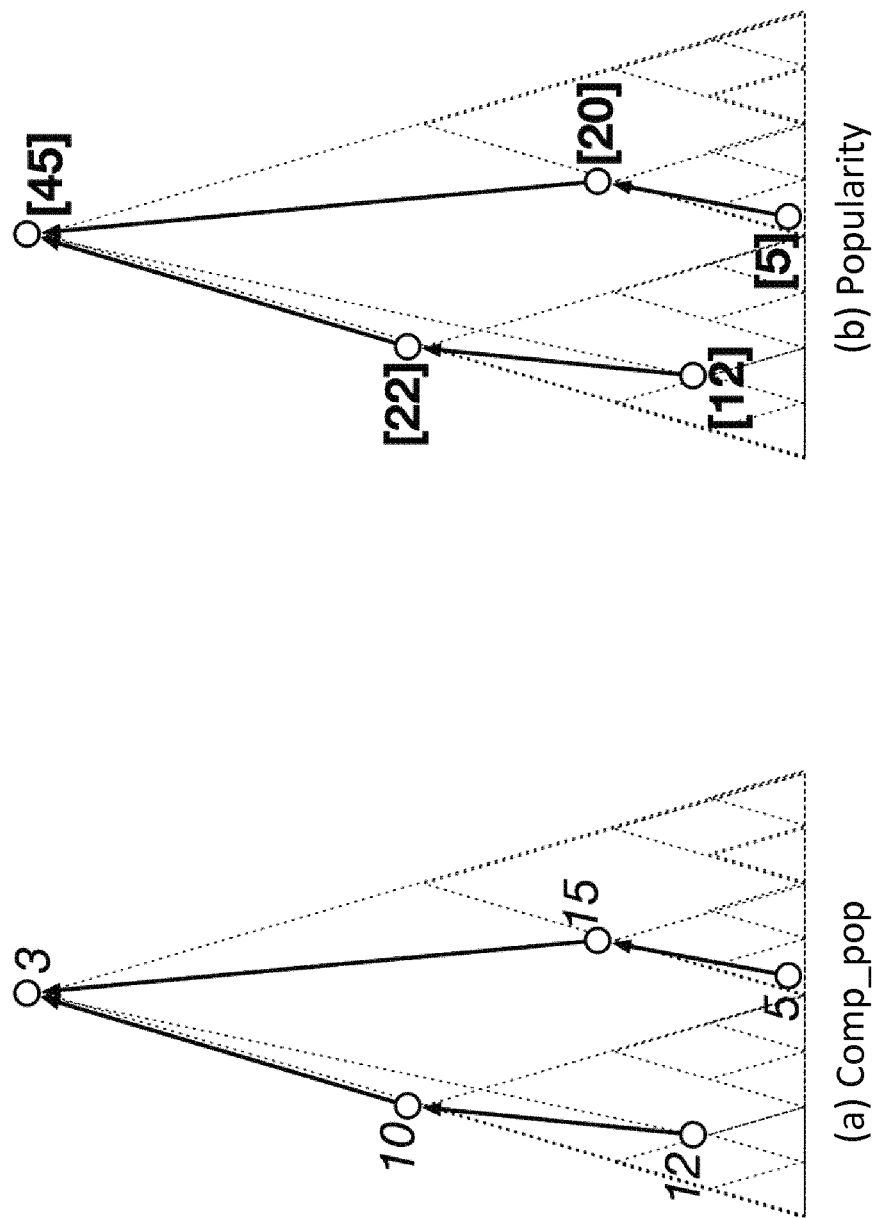
FIG. 6 Flowtree: Popularities.

FIG. 6 (a) annotates the tree nodes with their complementary popularities. For leaves, this corresponds to the node popularity. For interior nodes it is the popularity that is not accounted for by its children. The popularities are determined from the complementary popularities for each node by summing the complementary popularities of all nodes in its subtree including its own. This can be computed with the help of a depth first search in the Flowtree:

Algorithm 4 Stats

Input: Flowtree
1:    Initialize pop to comp pop for all nodes
2:    Node_list = nodes of Flowtree in DFS order
3:    for node in Node_list do
4:        pop[parent(node)] += pop[node]

Thus, the complexity of the operation is O(Nodes in Flowtree).

FIG. 6 (b) shows the resulting tree annotated with the resulting popularity. While the popularities obey the maxheap property the complementary popularities do not. This observation allows updating only the leaves or the first interior parent of a node during flow processing.

Flowtree Node Deletion

Even if a node is deleted, the invention keeps track of complementary popularity captured by the node by adding the node's complementary popularity to its parent. This is what would have happened if the node would not have existed and corresponds to the hierarchical structure of the feature hierarchy.

Thus, if one removes a node, e.g., 212.1.1.0/24 (1-dim feature IP dst address) with Flowtree parent 212.1.0.0/16 and com pop of 10, this value of 10 will be added to the complementary popularity of 212.1.0.0/16. Removing a node means that the nodes children become children of the nodes parent:

Algorithm 5 Delete

Input: Flowtree, node
1:    parent = find_parent(Flowtree, node)
2:    comp_pop[parent] += comp_pop[node]
3:    children (parent) += children (node)
4:    Free node Flowtree Compression Motivated by the ideas of the Expand and Collapse algorithm [19] one needs to expand nodes that are popular and shrink/remove nodes that are unpopular. This is done by compressing the Flowtree:

Algorithm 6 Compress

Input: Flowtree, thresh_comp_pop, thresh_pop
1:    Stats(Flowtree)
2:    for each node do
3:        if (node is leaf and
          comp_pop[node] < thresh_comp_pop) then
4:            Delete(Flowtree, node)
5:        else if (comp_pop[node] < thresh_comp_pop
          and pop [node] < thresh_pop)then
6:            Delete(Flowtree, node)

Hereby, ideas similar to wavelet compression are used. For many signals the coefficients of the wavelet transformation are centered on zero with only a small number of coefficients that are larger. Wavelet compression eliminates those close to zero while capturing most intrinsic aspects of the signal. This is enabled by the hierarchical structure of the wavelet decomposition. For Flowtrees similar observations hold.

The complementary popularity of most leaf nodes is one and that of most interior nodes is zero. This is due to the heavy-tailed nature of Internet traffic that applies to Internet flows [33]. Therefore, nodes whose complementary popularity is in the bottom quartile of all complementary popularities can be deleted. But the information about this popularity is still preserved by adding its contribution to its parent. To ensure that the flow popularity estimations derived from the Flowtree are accurate, the invention relies on the observations by Kammenhuber and Kencl (N. Kammenhuber and L. Kencl. Efficient Statistics Gathering from Tree-Search Methods in Packet Processing Systems. In IEEE ICC, 2005). They show that for a hierarchy of height H and a max popularity of f(0) it is possible to maintain precise information for all nodes hit at least $1=x*f(0)$ time with $x*H$ counters.

Figure 7:
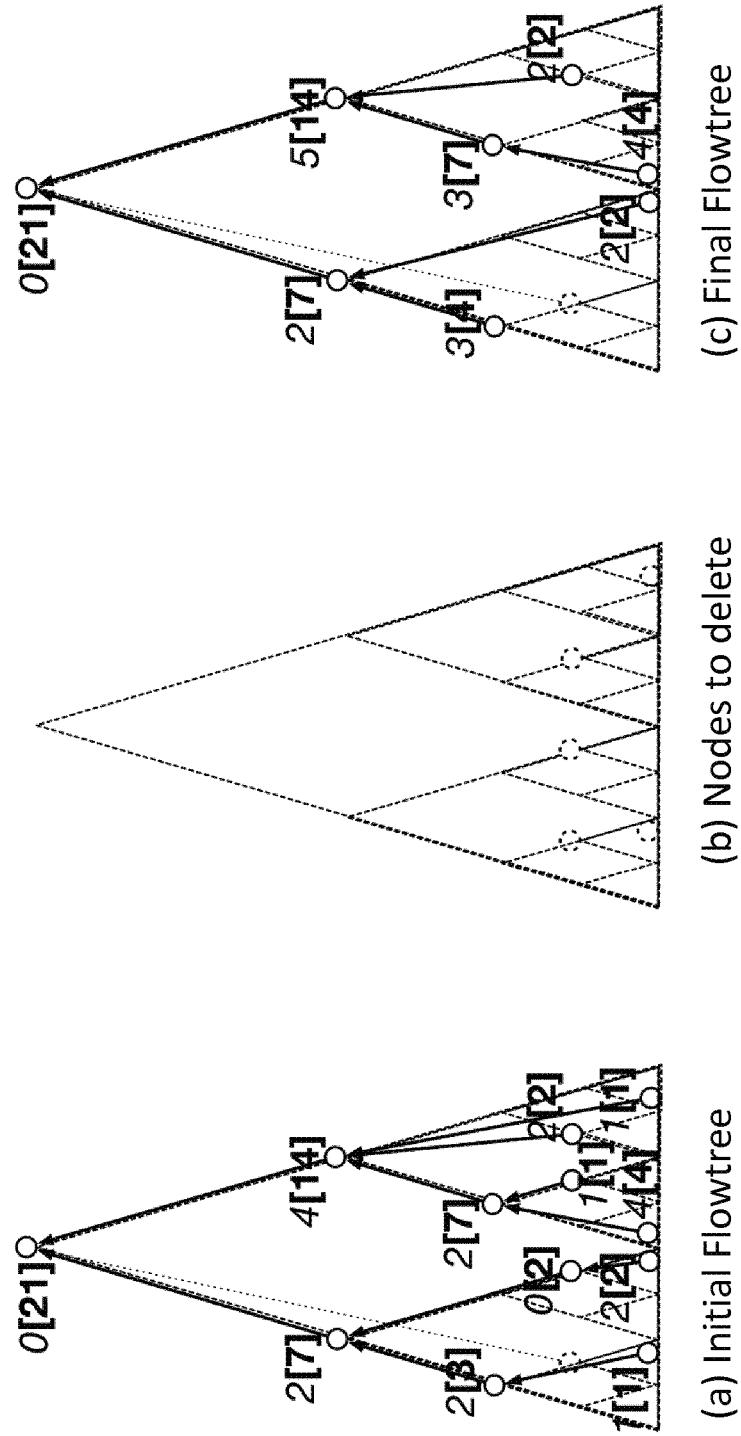
FIG. 7 Compress (thresh comp pop 1, thresh pop 2.5).

The inventive idea for compressing the flow tree is to keep nodes that do contribute substantially to either the complementary popularity or the overall popularity. Thus, two thresholds are used: thresh comp pop, thresh pop. One is derived from the Flowtree leaves based on the complementary popularity and one from the interior nodes and the popularity. Thresh comp pop is set to the bottom quarter and thresh pop to the median. Then leaves are deleted whose current comp pop is less than thresh comp pop and interior nodes whose current comp pop is less than thresh comp pop and whose pop is less than thresh pop. Should this not yield sufficient memory, the thresholds are increased by a small multiple each and repeat. The latter may be necessary since the bottom quarter and the median values are chosen rather conservatively. Indeed, the bottom quarter is often equal to the bottom median. Thus, Flowtree maintains the invariant that each node in a compressed Flowtree contributes a significant fraction to either the complementary popularity or the popularity itself. See FIG. 7 for an illustration.

Queries

Figure 8:
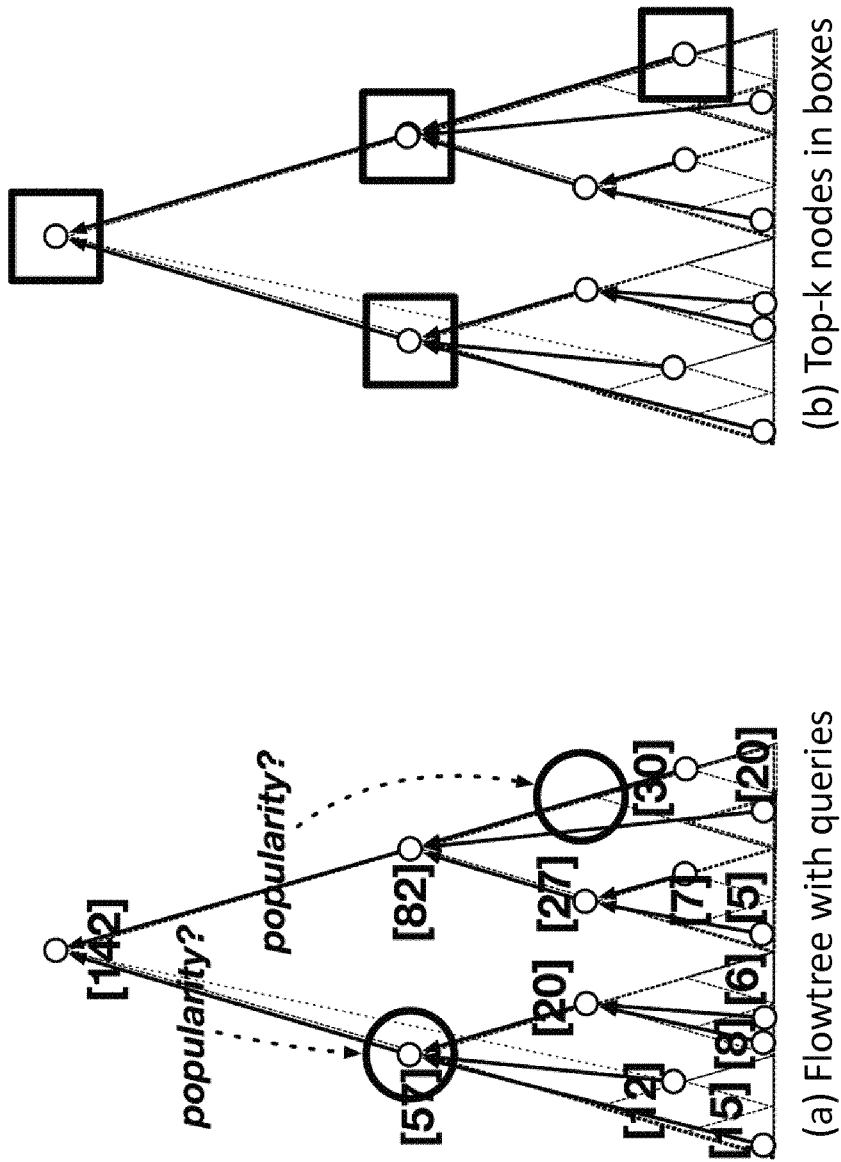
FIG. 8 Three queries: (i) Node is in Flowtree!value 10, (ii) node not in Flowtree!value 50, (iii) Top-K query.

If a user issues a query for flow f there are multiple options. If the node n which corresponds to f is in the Flowtree one can directly answer the query. If it is not in the subtree but a parent p of it is 0 can estimate its popularity in three ways. For this the children of p (C) are split in two subsets: C_f and C_0=C–C_f. C_f are those that are a subset of f in the feature hierarchy. Now the sum c in C_f pop(c) is a lower bound for the popularity of f. Two estimates of f's popularity are pop(f)=pop(p)–sum_c in C_0 or pop(f)=comp_pop(p)+sum_c in C f, see FIG. 8.

Note, as one goes higher in the aggregation, these estimates are expected to become more and more accurate, given that such nodes are more popular and, thus, the their estimation accuracy increases. Moreover, the contribution of deleted nodes is pushed upward in the hierarchy and maintained there.

If a user issues a query that does not correspond to the hierarchy itself it can still be answered. For this the query has to be decomposed into a set of queries that can be answered by the given hierarchy. For example, if a user wants to get the answer for source IP 6/7 and destination 24/5 and only statistics for prefixes with a step size of two (/0, /2, /4, etc.) are available, the system would need to add the answers from four queries, namely 6/8 24/6, 6/8 28/6, 7/8 24/6 and 7/8 28/6.

Top-K

There are two ways of querying for the top-K flows. One is to specify a number of flows, the other is to specify a relative popularity threshold. Flowtree is an ideal data structure to answer such queries as the invariant for a node in the Flowtree is that it contributes either a significant fraction to the complementary popularity or the popularity itself. Thus, to answer the query all Flowtree nodes are sorted according to their popularity and then return either the top-K flows or those whose popularity adds to the desired fraction. However, this may yield overlapping flows which may or may not be desired.

The alternative query is Top-K leaves. Top-K leaves will iteratively identify the Flowtree leaf with the largest popularity, delete its contribution, and, then, iterate. For this a priority queue is used. Initially, the priority of each node is initialized to its popularity and the queue is initialized with all leaves. Upon extracting the highest priority flow f the priorities of all its parents are reduced by its own priority and its direct parent to the priority queue. Note, this can still yield overlapping flows, e.g., flow 12/8,12/8 as well as 12/4, 12/4 if, e.g., the popularity of 12/8,12/8 is 10K and of 12/4,12/4-12/8,12/8 is 9K.

Merge

Two Flowtrees A and B can be merged by adding the nodes of one B to A or vice versa. This means that the update will only be done for the complementary popularities:

---
Algorithm 7 Merge
---
Input: Flowtree 1, Flowtree 2
Output: Flowtree
1:        Flowtree = Flowtree 1
2:        for each node in Flowtree 2 do
3:           Add_node(Flowtree 1, node)
4:        return Flowtree
---

Figure 9:
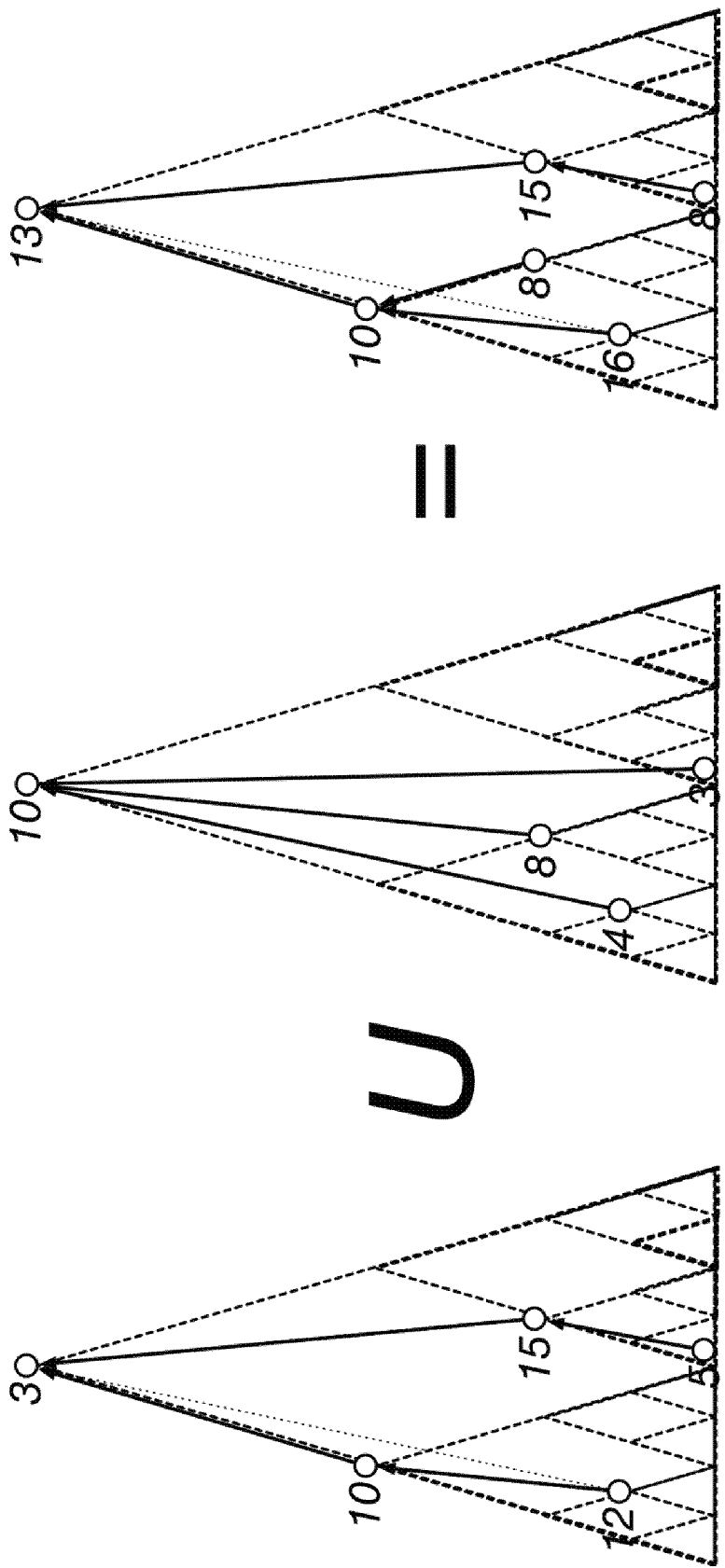
FIG. 9 illustrates a Flowtree data structure merge operation according to an embodiment of the invention

See also FIG. 9.

Afterwards, it is suggested to recompute the statistics via Alg. 4. If memory is a concern one can next compress the joined tree and, thus, keep the most important joined features. If the total absolute contribution of each tree differs significantly, one can also rescale the complementary popularity of each tree before the merge.

Diff

Just as one can merge two Flowtrees A and B, one can also compute the difference between the two trees. For this purpose the trees are merged again. But instead of adding the complementary popularity, it is subtracted:

---
Algorithm 8 Diff
---
Input: Flowtree 1, Flowtree 2
Output: Flowtree
1:        Flowtree = Flowtree 1
2:        for each node n in Flowtree do
3:           if node n2 in Flowtree 2 then
4:              d = comp_pop(n) − comp_pop(node2)
5:           if d > 0 then
6:              comp_pop(n) = d
7:           else
8:              Delete(Flowtree, n)
9:        return Flowtree
---

Figure 10:
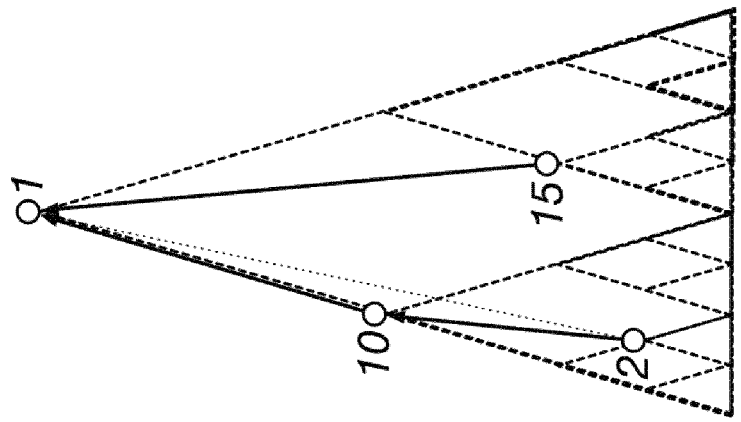
FIG. 10 illustrates a Flowtree data structure difference operation according to an embodiment of the invention
Figure 10:
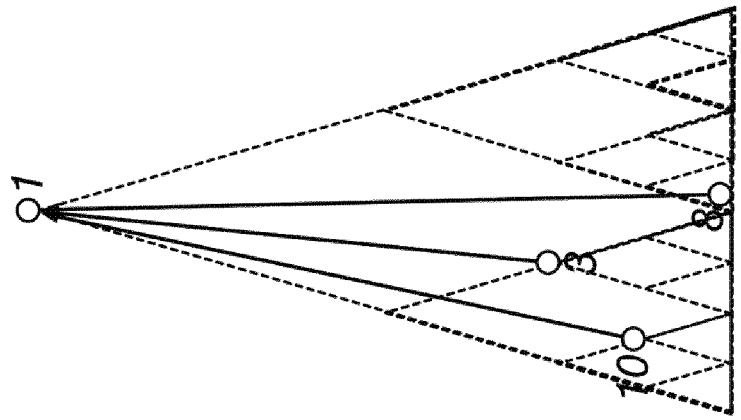
Figure 10:
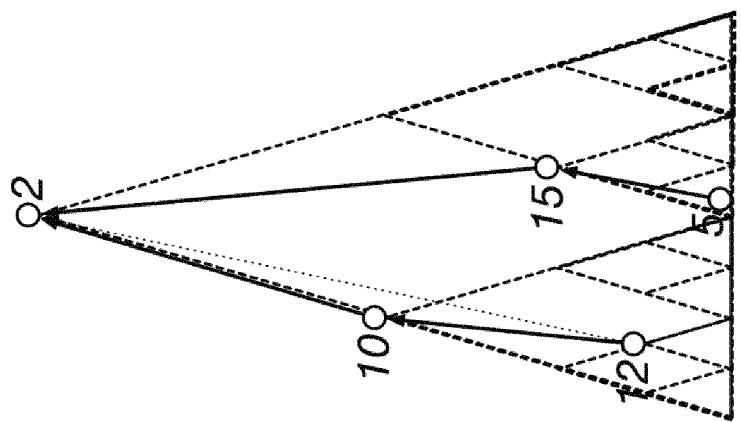

See also FIG. 10. Then, by finding the Top-K one can identify major differences by considering the absolute value of the new complementary popularities on a flow level. This is, e.g., useful for change detection.

For example if Flowtree A is from time T1 and Flowtree B is from time T2 the diff operator allows to find which significant new flows occurred and which ones disappeared. This can be critical, e.g., to identify attacks or see if a traffic engineering attempt was successful. In an attack scenario the diff may report that a prefix a.1.2/24 is suddenly tracked by B but not by A while A only tracks a/8. Yet, the difference for a/8 in A and B is only 10% as it is a fairly popular prefix.

Flowtree Extension

Figure 11:
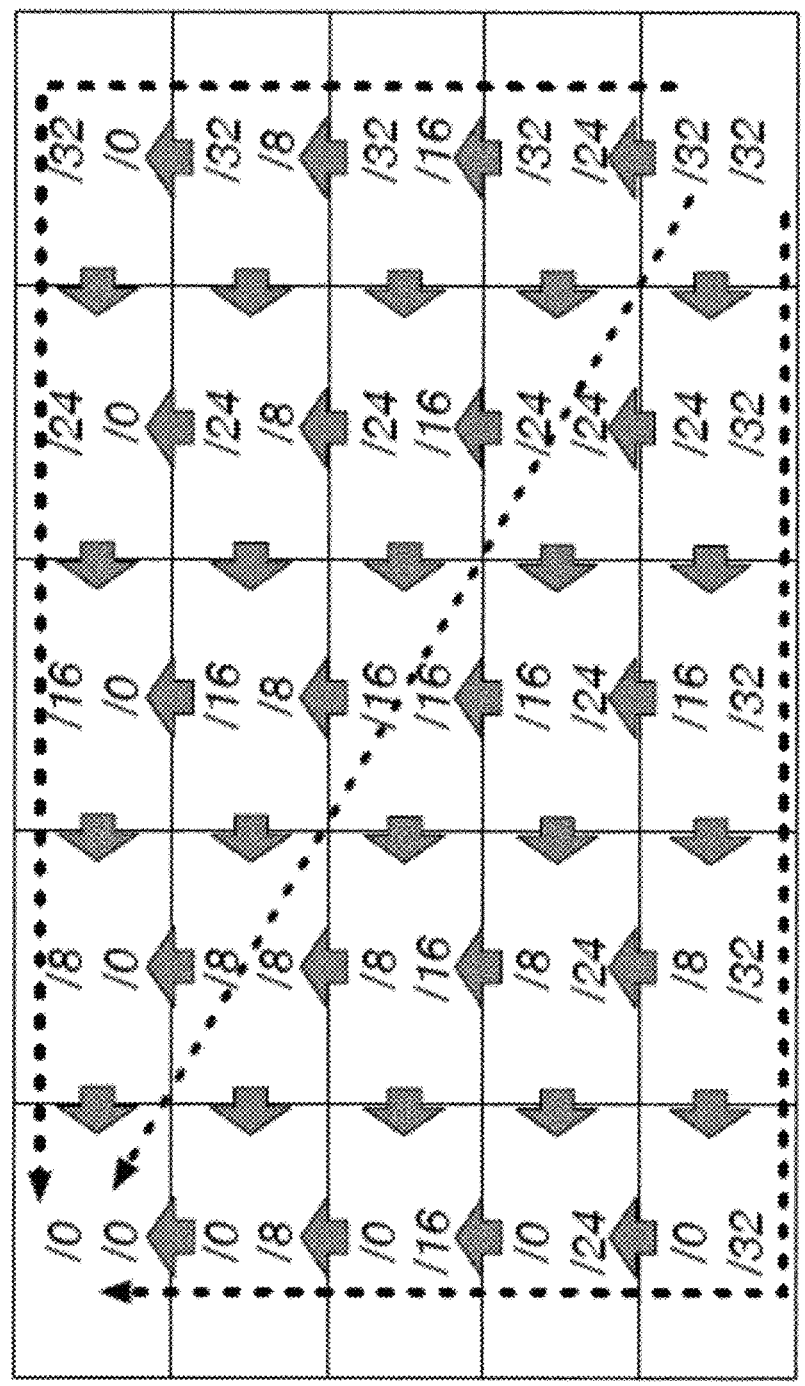
FIG. 11 illustrates a Flowtree data structure approach for 2-D HHH and IPs according to an embodiment of the invention.

Flowtrees can also be extended to go beyond 1-dimensional hierarchical heavy hitters by keeping multiple Flowtree hierarchies in parallel. This is feasible since the cost of updating each hierarchy is constant. For example for 2-D HHH for src and dst port, one simple approach is to use three hierarchies. The first hierarchy decrements both prefix length by source prefix. Once it reaches zero it decrements the destination prefix. The third one is the complement of the second one. With this data structure, one can answer any 1- and 2-dimensional query. To reduce the query time overhead one can cover the 2d-space more aggressively by adding more intermediate hierarchies, see FIG. 11. This allows to solve the 2-D HHH with O(#H) updates.

Flowtree Analysis

Next, the cost of maintaining Flowtrees as well as the operators is explained. For the cost of processing a flow F resp. packet with features f, there are two cases: Either one already has a node tn for f in the Flowtree. Then finding and updating it takes O(1) time given the preferred hash-based lookup approach. Otherwise one needs to locate a parent p of tn in the Flowtree. Using the preferred hash-based lookup schema this takes at most time O(H). However, the expected cost is O(1) as one can expect to find an existing node on the path from the new node to the root quickly for almost all nodes due to the added interior nodes and the heavy-tailed nature of popularities.

The cost of deleting a node depends on the number of children of its parent. In the worst case this could be almost all nodes. However, this cannot happen as interior nodes are deleted conservatively. If an interior node has many children, then it has a high popularity, which implies that it will not be deleted. Thus, the expected cost is O(1). As a consequence the cost of the Merge and Diff operators is O(N) if N is the number of nodes in the tree.

The cost of compress consists of two parts: The cost of computing the statistics, which can be done in O(N) time, and the cost of delete. Thus, reclaiming a constant fraction of nodes has an expected to cost O(N). The cost of executing a Top-K query is O(N+K log N). For reasonable K this corresponds to O(N). O(N) is also the average cost of executing N individual queries.

With regard to the accuracy of the popularity estimation via the Flowtree, all estimations are lower bounds of the real popularity. Moreover, the upper bound is determined by how often the compress operator is executed and the threshold values that are within compress. Considering an example where the input popularity is consistent with a heavy-tailed distribution with $\alpha<0.5$ and a maximum flow popularity of 1M. Given the present choice of threshold value which is the bottom quarter of the popularity distribution 50 compress operations will impose a worst case error of 220 (0:02% of the total popularity of 1M), 100 compress operations lead to a maximum error of 440 (0:04%).

Evaluation

The evaluation of the Flowtree performance is based on three different flow resp. packet captures:

IXP: This dataset consists of IPFIX flow captures at one of the largest Internet Exchange Points (IXPs) in the world with around 750 members and more than 5 Tbps peak traffic. The IPFIX flow captures are based on random sampling of 1 out of 10K packets that cross the IXP switching fabric. Each anonymized capture includes information about the IP and transport layer headers as well as packet and byte counts. The flow captures used for the present evaluation were collected on Jan. 23, 2017 and include more than 112M flows.

Equinix-Chicago: This a packet-level capture of a 10 Gbps link using Endace network monitoring cards at the Chicago Equinix datacenter on Feb. 18, 2016. The anonymized trace is publicly available from CAIDA (The CAIDA UCSD Passive Monitor: Equinix-Chicago—2016 Feb. 18. https://www.caida.org/data/monitors/passive-equinix-chicago.xml). Each packet capture lasts for one minute and contains more than 32M packets.

MAWI: This dataset consists of packet-level capture collected at the transit 1 Gbps link of WIDE academic network to the upstream ISP on Nov. 10, 2017. Each packet capture lasts for 15 mins and contains around 120M packets. The anonymized trace is publicly available from the MAWI Working Group Traffic Archive. (http://mawi.wide.ad.jp/mawi/).

Flowtree is a self-adjusting data structure that allows the addition and deletion of nodes as it processes a stream of flows. Hereby, the very popular entries are represented as leaf nodes in the tree, while less popular nodes are aggregated and represented at nodes at higher hierarchy levels. To assess Flowtree's accuracy for popular entries, a three-step approach is used. In a first step it is checked how accurately Flowtree can estimate the popularity of flows for which it keeps an explicit counter (node). Next, it is checked if the self-adjusting Flowtree keeps counters for the most popular generalized flows. Finally, it is explored how large the estimation error is for flows without counterparts in the Flowtree.

Figure 12:
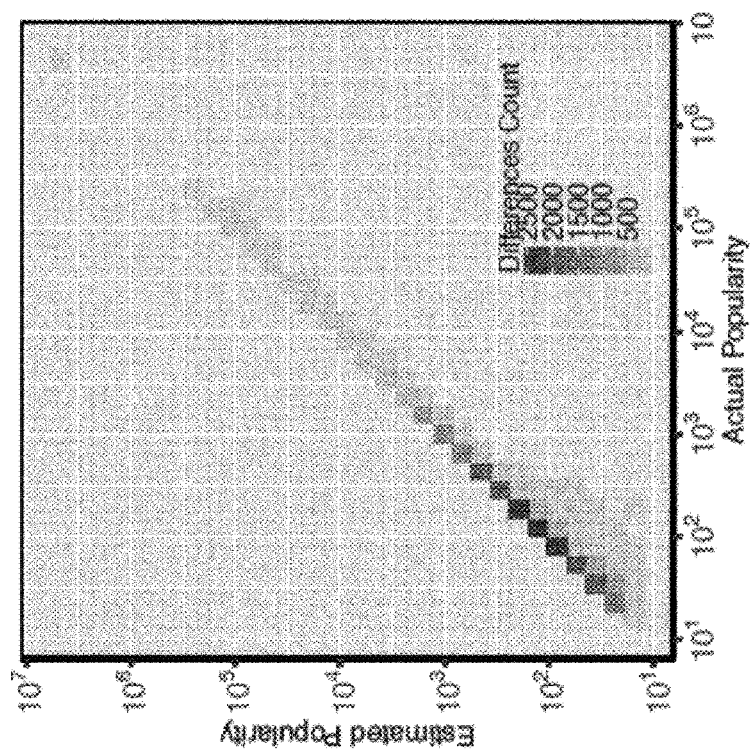
FIG. 12 illustrates an accuracy of Flowtree data structures (4-f, 40K nodes) for all three datasets.
Figure 12:
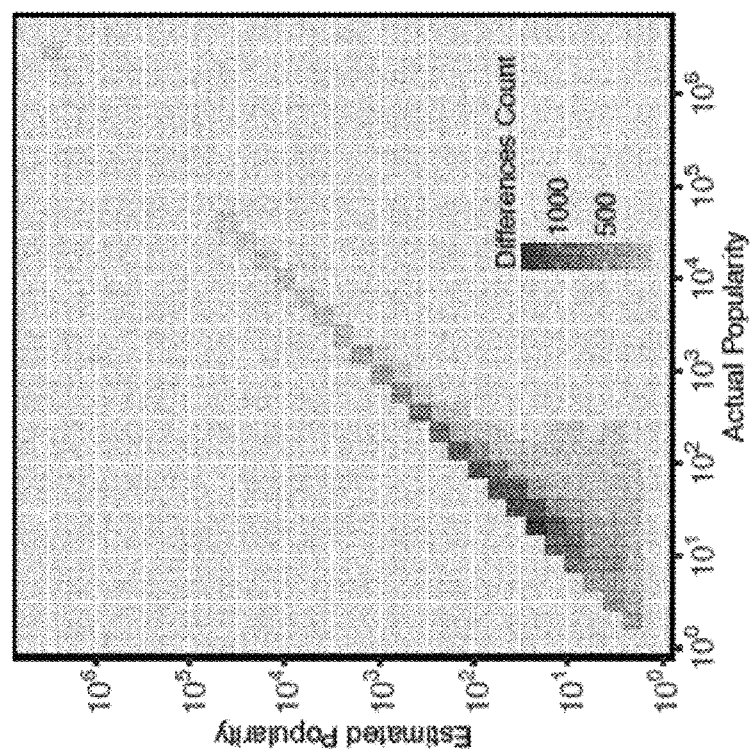
Figure 12:
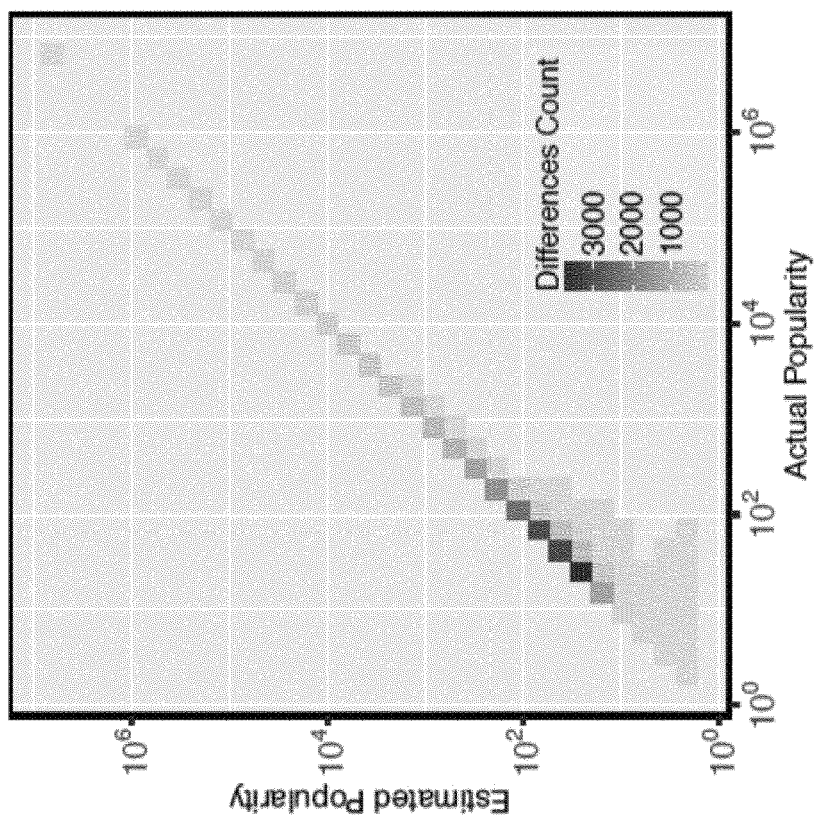

FIG. 12 shows a two-dimensional histogram of the estimated popularity vs. the real popularity for those generalized flows for which Flowtree maintains a node. The color legend shows the number of instances of the entries (using a log-scale): The darker the color, the larger the number of instances represented by this point. Thus, the difference of the x-value and the y-value yields the difference between the estimated and the real popularity of an entry. For this experiment a memory limit of 40K nodes and 4-feature set (scr/dst IP and scr/dst port) is used. The general observation, across all datasets, is that the large majority of all entries are on the diagonal. Indeed, for more than 25%, 57%, 62% of entries the difference between the real and estimated popularity is _1. For more than 63%, 83%, 86% of entries the difference is _10, and for more than 99.7%, 99.7%, 99.9% the difference is _100.

The second observation is that for the entries that are not on the diagonal, the estimated values of popularity, with Flowtree, are below the diagonal. Thus, the estimated popularity are indeed smaller than the actual one which corresponds to the design of Flowtree and the need of network operators. The third observation is that for a popular entry the likelihood that the estimated and the exact value are identical is very high. Note, FIG. 12 uses a logarithmic x- and yaxis. This underlines the property of Flowtrees which keeps highly accurate summaries for the popular entries. Note that the same also applies to medium popular items. This is an improvement compared to the HHH data structures which focuses on highly accurate summaries for very popular entries. As the popularity of an entry decreases, the difference between the estimated and actual popularity can deviate. However, even for a significant fraction of these unpopular entries, the estimated popularity is rather accurate. Moreover, the popularity of such unpopular entries is captured at higher levels of the flow hierarchy.

Assessing the efficiency of the self-adjusting nature of the Flowtree corresponds to assessing the appropriateness of the compress operator and the node addition strategy. Recall, the compress operator eliminates leaves with small complementary popularity values or interior nodes with small popularity to free memory for new nodes. The add operator adds leaf and interior nodes for "new" flows. Therefore, the Flowtrees are built without invoking the compress operator and the difference to the Flowtrees is then computed with memory limits. Experiments for 4-feature sets and 40K memory limits confirm that the appropriate nodes are kept, as all nodes corresponding to flows that account for more than 1% of the total popularity are kept.

Finally, the absolute size of the estimation error is assessed. For this a log of all node additions and deletions during flow processing is kept. Natural questions to consider are: (i) How much does the churn affect the accuracy of entries, as the deletion of a leaf node reduces its contribution at this level—even though this is addressed by increasing the popularity of the parent (compression), and (ii) is the data structure prone to oscillations, i.e., nodes are often deleted that are continuously popular, and are, thus, added again and again to the tree. To answer these two questions the inventors studied how often each node is deleted and what is the sum of the popularity of these nodes.

Figure 13:
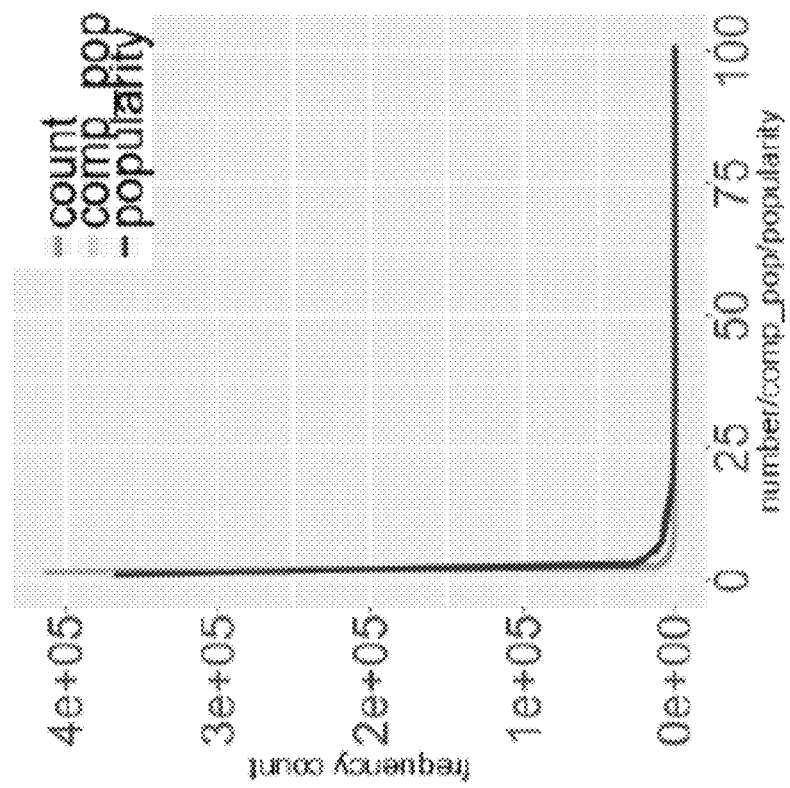
FIG. 13 shows histograms of # of node deletions, deleted comp pop and popularity for IXP, Equinix-Chicago, MAWI.

To address the first question, FIG. 13 shows the histogram of the cumulative complementary and the cumulative popularity of nodes that where deleted for the 4-features (src/dst IPs and src/dst ports) and Flowtrees with 40K nodes. It is easy to see that for the large majority of the entries the total popularity shifted to the parent is 1 and almost never exceeds 25. Thus, the estimated popularity of deleted nodes is not significantly affected by compression confirming a theoretical analysis. To investigate the second question, i.e., how often an entry is deleted we, in FIG. 13, plot a histogram of the number of times that the same node is deleted. Again, the number of repeated deletions is small (typically one). Such churn is expected as less popular nodes will be added and, eventually, deleted due to their low popularity. Given that the number of repeated deletion is almost always less than 10, it is easy to conclude that oscillations are not a major problem and that the estimation accuracy is high both for popular and unpopular nodes.

Figure 14:
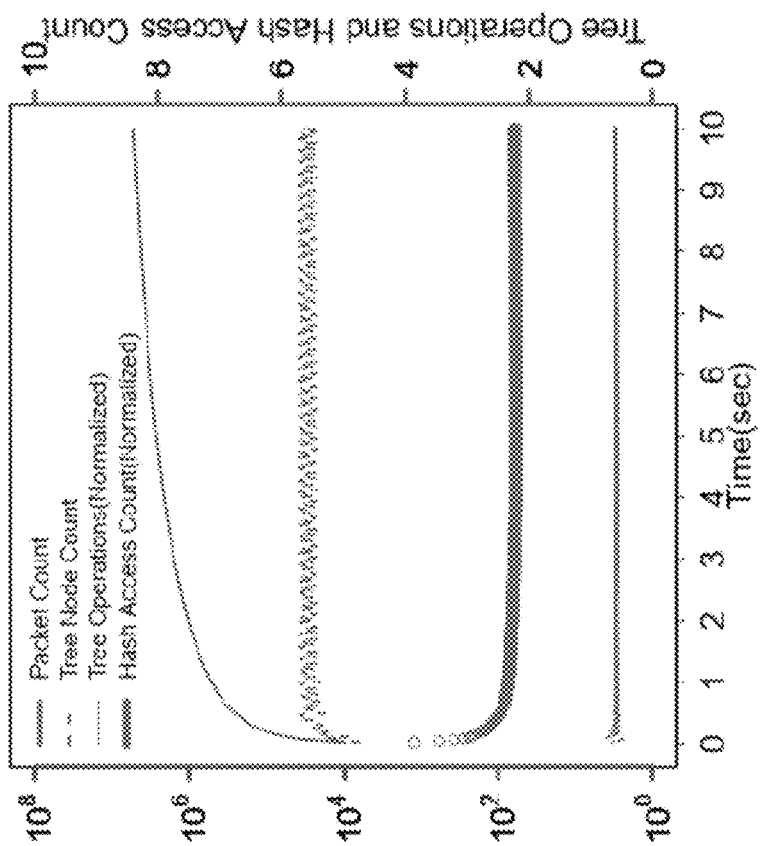
FIG. 14 shows Flowtree data structure resource usage across data sets, feature sets, and node memory.
Figure 14:
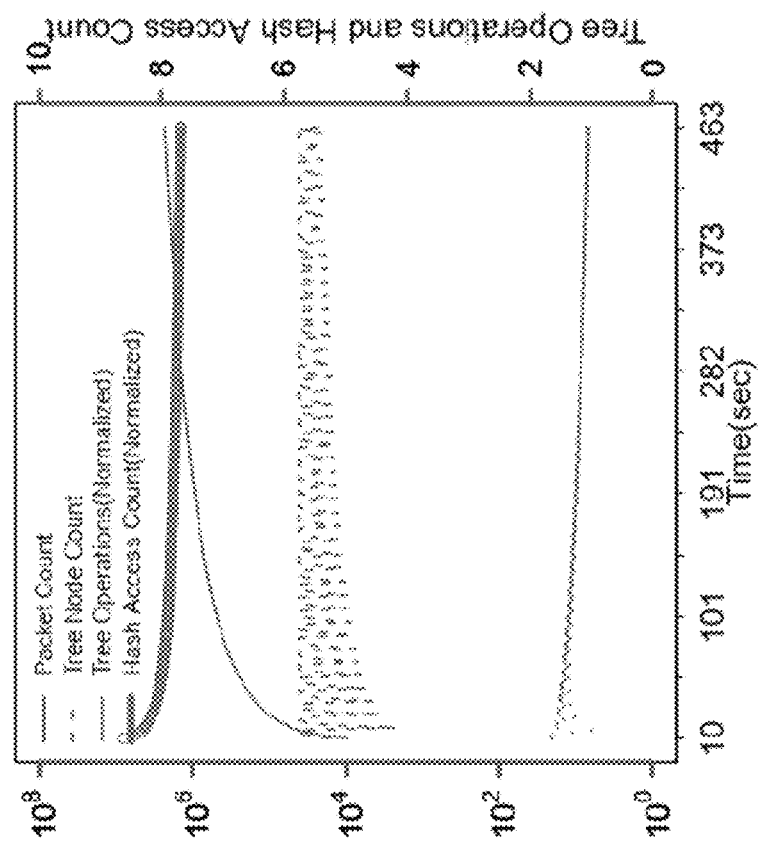
Figure 14:
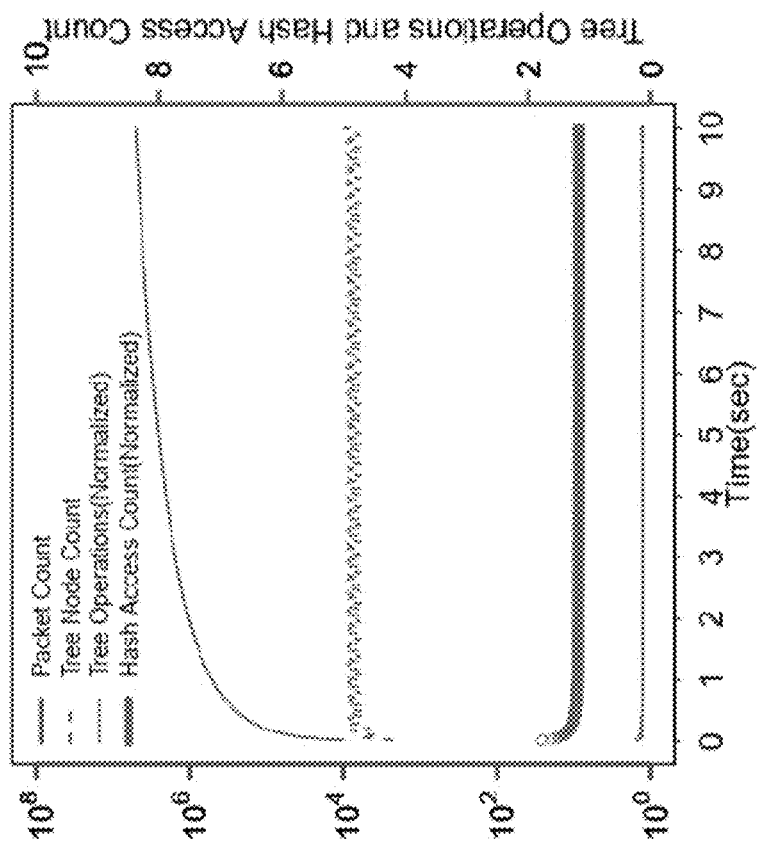
Figure 14:
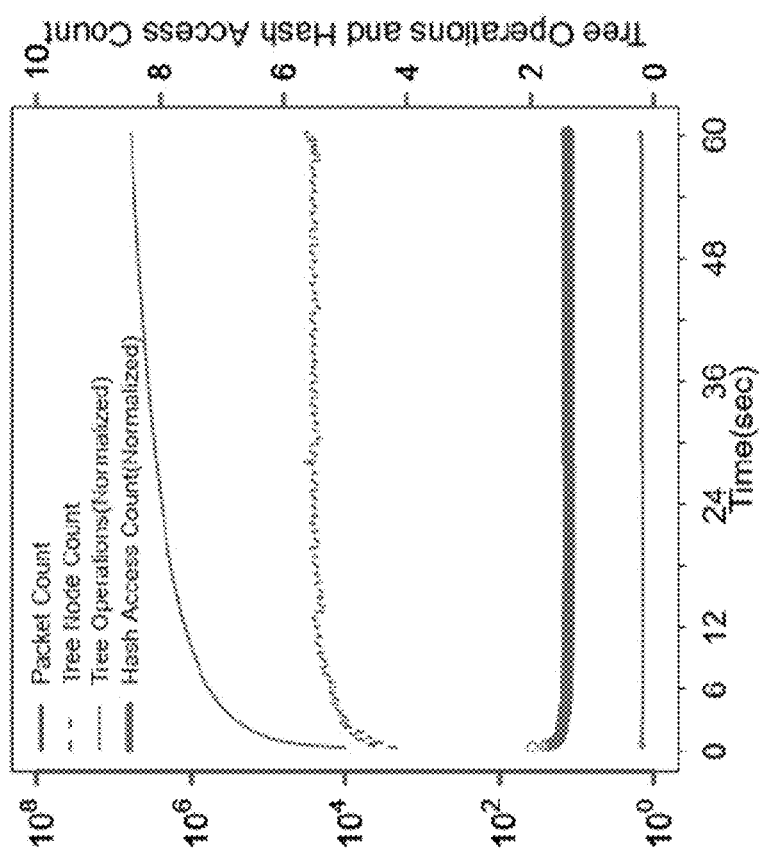
Figure 14:
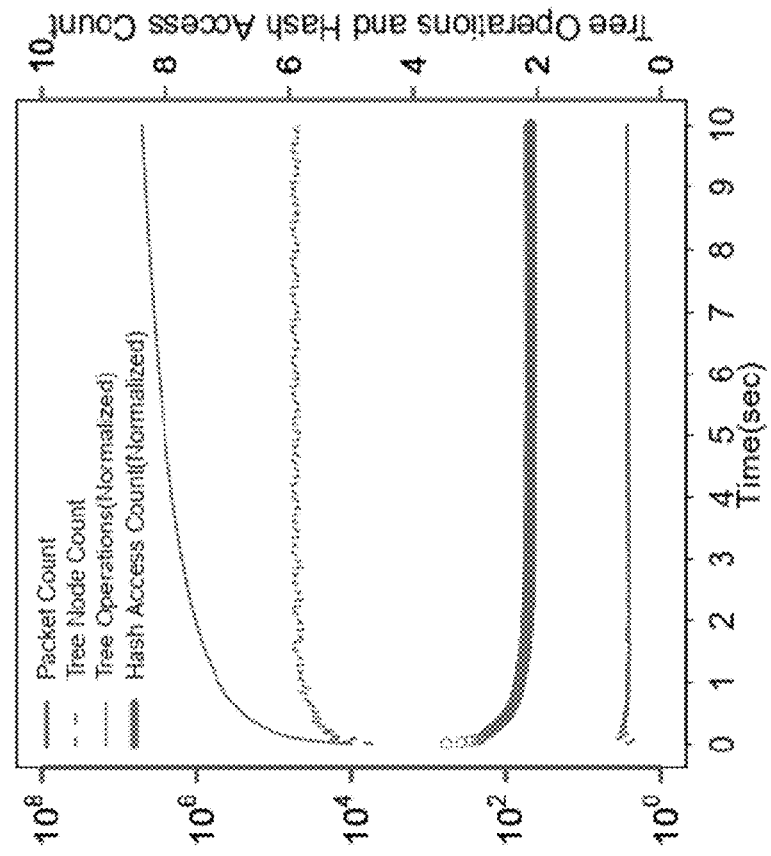
Figure 14:
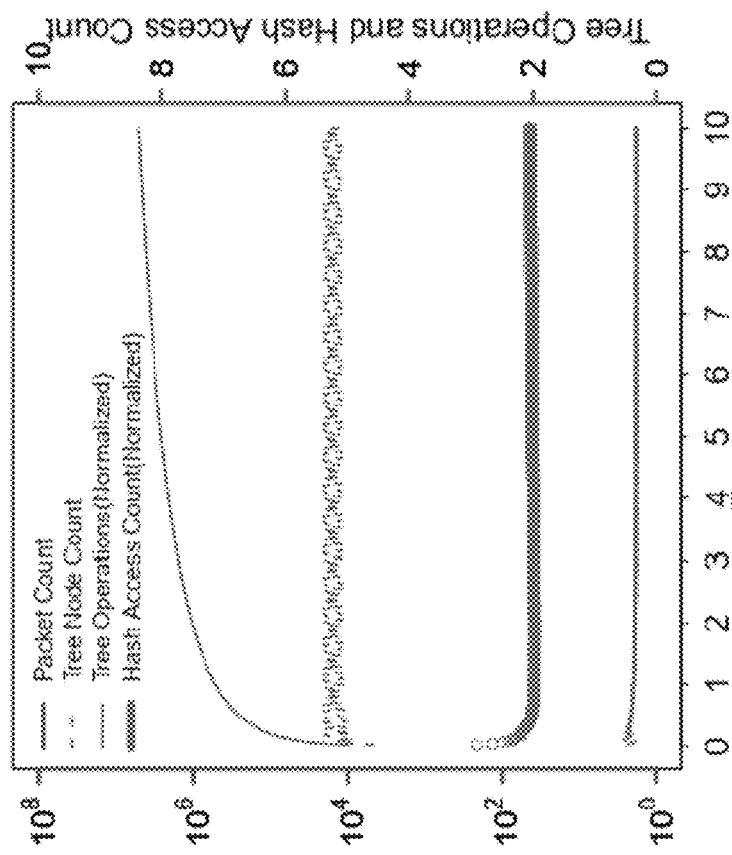

Turning now the attention to the resource efficiency for constructing and maintaining Flowtrees by tracking memory usage as well as number of operations (computational resources), FIG. 14 shows the number of tree nodes (dashed line) for the three datasets with 4-features (src/dst IPs and scr/dst ports) over an initial time window, focusing on the initial time window to highlight the fast convergence. Each Flowtree is generated with a maximum number of tree nodes of 40K, which is never exceeded.

Therefore, one has a compression ratio of >95% as soon as 800K packets have been processed. As visible in the plot, periodically (every 50,000 entries), the compress operator is used to reclaim memory. This memory reclaim ensures that the tree stays within the maximum allocated memory specified, even if the number of flows or packets grows.

With regards to the number of tree operations in relation to the number of processed packets and flows, FIG. 14 shows that the ratio converges to low values—around 2 for the IXP dataset and :4 for the other two datasets. This is a desirable property as it shows that the cost of maintaining the Flowtree is constant. Same observations hold for the number of hashes as the number of processed flows or packets increases. Indeed, the ratio converges to a value less than 8 for the flow captures and around 2 for the packet captures. This is another indicator that updating the counts in the hierarchy is cheap using hashing. The main reason for the increased hash count for the IXP data set is that the diversity of flows at this location is significantly larger compared to the other datasets, since traffic among more than 750 peers is captured rather than the traffic of a single backbone link. By increasing the available memory by a factor of two the number of hashes converges to 2 and the number of tree operations per flow decreases to less than one.

In order to evaluate whether Flowtree works well for different feature sets and different memory constraints, while keeping the operational overhead low, feature sets are next varied from 1-f to 4-f together with the available memory. The results for the Equinix-Chicago dataset are also shown in FIG. 14 (d, e, b, f). When doubling the feature set size and the memory, the number of nodes in the tree, the normalized tree number operations and the normalized hash accesses remain roughly the same. For this dataset doubling the memory, e.g., for the 4-f case, does not reduce these values significantly. This indicates that the memory suffices so that Flowtree can capture the essential properties of the trace. Similar observations hold for the other datasets.

Figure 15:
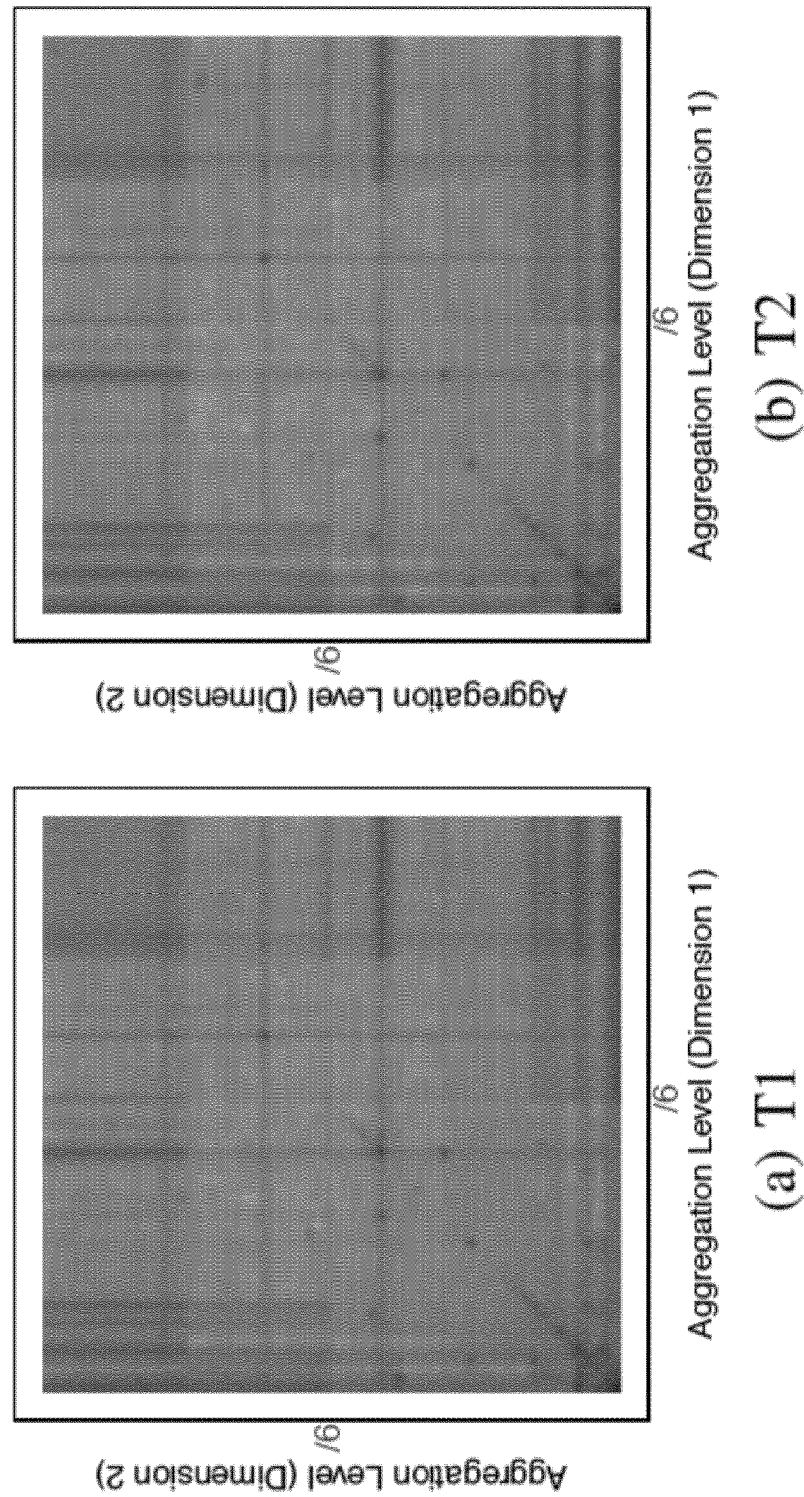
FIG. 15 shows results of Merge and Diff operations for two Flowtree data structures according to an embodiment of the invention.
Figure 15:
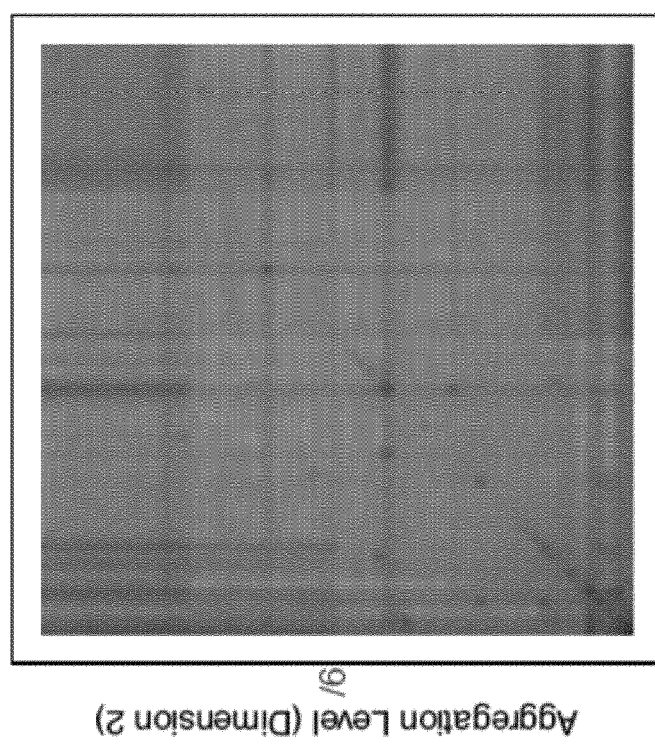

FIG. 15 shows the results of Merge and Diff operations for two Flowtree data structures according to an embodiment of the invention. More specifically, FIGS. 15(a) and (b) show the heatmaps for the flow estimates at the /6,/6 granularity (log scale and normalized) for (a) the merged Flowtree T1 for the first 4 traces, (b) T2 for the last 4 traces.

In particular, each trace was taken and split it into eighth subtraces of smaller duration. For each subtrace a Flowtree was computed with limited memory, e.g., 30K for 2-feature hierarchy src/dst port. Then the merge operator was applied recursively to consecutive subtraces until a single Flowtree was obtained again which covers the full trace.

FIGS. 15 (c) and (d) show the corresponding heatmaps when both the merge as well as the diff operator were applied to T1 and T2. In FIG. 15 (d) the absolute values of the differences are shown.

The first two plots show that the overall trends during the two time periods are similar, which is strongly reflected in the merged Flowtree, see (c). Indeed, on first look the merged Flowtree does not seem to differ significantly from T1 or T2. However, the diff, see FIG. 15 (d), reveals that some changes occurred between the two time periods. Thus, the merge and the diff operators together are excellent starting points for analyzing network traffic, in this case by port ranges over time.

Implementation

Example embodiments may also include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer executable instructions into the executable format and a second computer may execute the transformed instructions.

The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation.

Such networking environments are commonplace in office-wide or enterprise-wide computer networks, intranets and the Internet. Those skilled in the art will appreciate that such network computing environments will typically encompass many types of computer system configurations, including personal computers, hand-held devices, multiprocessor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer readable media provide nonvolatile storage of computer executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

SUMMARY

The inventive data structure, called Flowtree, can efficiently summarize network traffic and enables on-the-fly queries. It was shown how to use Flowtrees as building block for a scalable trace management system, called Flowstream, which can be deployed network wide and offers on-the-fly queries even across sites and time. Flowstream operates on top of existing network trace capture utilities. Based on a prototype implementation it was shown that the data structure is efficient in terms of resource usage and offers accurate estimations for network activity for generalized flows.

Possible flow hierarchies range from 1-feature sets, e.g., src or dst port ranges or IP prefixes, to 2-feature sets, e.g., src and dst IP prefixes or dst port range and dst IP prefixes, to full-fledged 5-feature sets. Flowstream is responsible for collecting, organizing, storing these trees across sites and across time to timely answer queries about the whole network at scale.

The invention claimed is:

1. A computer-implemented method for monitoring and/or controlling an electronic, packet-switched communication network, based on particular packet flow summaries,
   each of said particular packet flow summaries having been obtained by a process for capturing summaries of data flows in an electronic, packet-switched communication network, the process comprising:
      storing a collection of packet flow summaries, wherein each packet flow summary is arranged as nodes in a tree data structure, wherein each node represents a flow according to a predefined feature hierarchy;
      receiving, from a node of the communication network, packet flow data;
      obtaining a subset of packet flow parameters(IP src, IP dst, port src, port dst, protocol), based on the packet flow data;
      obtaining a packet flow statistic, based on the packet flow data; and
      updating the collection of stored packet flow summaries, based on a subset of the packet flow parameters and the packet flow statistic,
   characterized in that
      each node is annotated with a complementary popularity (comp pop), namely, its popularity that is not covered by any of its children.

2. The method of claim 1, wherein the updating comprises:
   checking whether a packet flow summary comprising the same subset of packet flow parameters already exists in the collection;
   updating a packet flow statistic of the existing packet flow summary, based on the obtained packet flow statistic, if yes; and
   adding a new packet flow summary, the summary comprising the subset of packet flow parameters and the packet flow statistic, otherwise.

3. The method of claim 2, wherein the adding a new packet flow summary further comprises:
   identifying a least general (longest matching) parent node of the added new packet flow summary.

4. The method of claim 3, wherein the adding a new packet flow summary further comprises:
   creating and adding one or more intermediate nodes.

5. The method of claim 4, wherein the one or more intermediate nodes are created and/or added based on a pre-determined probability.

6. The method of claim 5, wherein the pre-determined probability is essentially equal to 0.1.

7. The method of claim 1, wherein the packet flow parameters comprise at least one IP address.

8. The method of claim 7, wherein the IP address is represented in a classless interdomain routing (CIDR) format.

9. The method of claim 1, further comprising:
   merging two or more particular collections of stored packet flow summaries.

10. The method of claim 1, further comprising:
    determining top-K flows from one or more particular collections of stored packet flow summaries.

11. The method of claim 1, further comprising:
    determining a difference between two or more particular collections of stored packet flow summaries.

12. The method of claim 1, further comprising:
    querying a particular collection of stored packet flow summaries.

13. The method of claim 12, wherein a packet flow statistic of a packet flow summary is determined based on a sum of packet flow statistics of a node and packet flow statistics of at least some child nodes of the node.

14. The method of claim 1, further comprising
    exporting stored packet flow summaries over an electronic network via a standardized interface.

15. The method of claim 4, wherein the one or more intermediate nodes are created and/or added based on available storage space.

16. A non-transitory computer-readable medium with one or more computer programs stored therein that, when executed by one or more processors, cause the one or more processors to perform at least the operations of: the method of claim 1.

17. An article of manufacture comprising non-transitory computer-readable media having computer-readable instructions stored thereon, the computer-readable instructions including instructions for implementing a computer-implemented method, said method operable on one or more devices comprising hardware including memory and at least one processor, said method comprising the method of claim 1.

* * * * *